United States Patent [19]

Yamada et al.

[11] Patent Number: 5,659,607
[45] Date of Patent: *Aug. 19, 1997

[54] TELEPHONE SET

[75] Inventors: Makoto Yamada, Gifu; Fumihiro Minamizawa, Toyoake, both of Japan

[73] Assignee: Brother Kogyo Kabushiki Kaisha, Nagoya, Japan

[*] Notice: The term of this patent shall not extend beyond the expiration date of Pat. No. 5,649,007.

[21] Appl. No.: 352,782

[22] Filed: Dec. 1, 1994

[30] Foreign Application Priority Data

Dec. 7, 1993 [JP] Japan .................. 5-306482
Dec. 7, 1993 [JP] Japan .................. 5-306484

[51] Int. Cl.⁶ .............. H04M 1/00; H04M 1/64; H04M 11/00; H04M 3/00
[52] U.S. Cl. .............. 379/373; 379/82; 379/88; 379/179; 379/252; 379/387; 379/100.01
[58] Field of Search .............. 379/375, 374, 379/373, 376, 387, 354, 352, 350, 258, 233, 268, 252, 251, 246, 245, 201, 187, 183, 182, 181, 179, 177, 173, 167, 156, 102, 100, 97, 96, 93, 89, 88, 82, 70, 67

[56] References Cited

U.S. PATENT DOCUMENTS

| | | | |
|---|---|---|---|
| 3,946,146 | 3/1976 | Brown et al. | 379/164 |
| 4,591,664 | 5/1986 | Freeman | 379/375 |
| 4,646,347 | 2/1987 | Liu | 379/375 |
| 4,802,202 | 1/1989 | Takahashi et al. | 379/67 |
| 4,995,075 | 2/1991 | Angiolillo-Bent et al. | 379/142 |
| 4,998,273 | 3/1991 | Nichols | 379/102 |
| 5,029,202 | 7/1991 | Doernbach, Jr. et al. | 379/201 |
| 5,040,209 | 8/1991 | Greenberg et al. | 379/373 |
| 5,065,424 | 11/1991 | Miller | 379/70 |
| 5,073,922 | 12/1991 | Okada | 379/164 |
| 5,119,418 | 6/1992 | Dupillier | 379/373 |
| 5,142,569 | 8/1992 | Peters et al. | 379/201 |
| 5,200,992 | 4/1993 | Yoshino | 379/93 |
| 5,200,994 | 4/1993 | Sasano et al. | 379/142 |
| 5,253,289 | 10/1993 | Tanaka | 379/373 |
| 5,267,307 | 11/1993 | Izumi et al. | 379/201 |
| 5,307,059 | 4/1994 | Connary et al. | 340/825.44 |
| 5,317,629 | 5/1994 | Watanabe | 379/93 |
| 5,333,190 | 7/1994 | Eyster | 379/375 |
| 5,361,296 | 11/1994 | Reyes et al. | 379/96 |
| 5,425,089 | 6/1995 | Chan et al. | 379/183 |
| 5,442,692 | 8/1995 | Yamazaki et al. | 379/253 |
| 5,446,784 | 8/1995 | MacTaggart | 379/102 |
| 5,481,599 | 1/1996 | MacAllister et al. | 379/101 |
| 5,483,578 | 1/1996 | Ackermann et al. | 379/67 |

FOREIGN PATENT DOCUMENTS

| | | | |
|---|---|---|---|
| 4-48855 | 2/1992 | Japan . | |
| WO91/12685 | 8/1991 | WIPO | 379/374 |

*Primary Examiner*—Krista M. Zele
*Assistant Examiner*—Harry S. Hong
*Attorney, Agent, or Firm*—Oliff & Berridge

[57] ABSTRACT

A telephone set including a data obtaining device which obtains a plurality of sets of own-call-number data each set of which identifies a corresponding one of a plurality of different own call numbers allotted to the telephone set according to a common numbering rule, each of the different own call numbers identifying the telephone set from other telephone sets to which other call numbers different from the own call numbers are allotted according to the common numbering rule, a plurality of memories which are related with the different own call numbers, respectively, and in which a plurality of batches of sound information are stored, respectively, and a transmitter which transmits, to one of the other telephone sets, the batch of sound information stored in one of the memories which corresponds to one of the different own call numbers identified by one of the sets of own-call-number data obtained by the data obtaining device. Another telephone set including, in addition to the data obtaining device, a plurality of received-information memories related with the different own call numbers, respectively, and a receiver which receives a batch of sound information from one of the other telephone sets and stores the received batch of sound information in one of the received-information memories which corresponds to one own call number identified by one set of own-call-number data obtained by the data obtaining device.

15 Claims, 32 Drawing Sheets

FIG. 5

| RAM | |
|---|---|
| IDENTIFIED CODE-NUMBER MEMORY | 140 |
| SELECTED-MODE MEMORY | 142 |
| CODE NUMBER-RELATED MEMORY | 144 |
| TRANSMISSION MEMORY | 148 |
| RECEPTION MEMORY | 150 |
| INPUT CODE-NUMBER MEMORY | 152 |
| RECORDING MEMORY | 154 |
| READING MEMORY | 156 |
| FIRST SIGNAL-PATTERN MEMORY | 158 |
| SECOND SIGNAL-PATTERN MEMORY | 160 |
| PRIOR SIGNAL-STATE MEMORY | 162 |
| CURRENT SIGNAL-STATE MEMORY | 164 |
| FIRST COUNTER | 166 |
| SECOND COUNTER | 168 |
| THIRD COUNTER | 170 |
| FIRST FLAG | F1 |
| SECOND FLAG | F2 |
| THIRD FLAG | F3 |

| ROM | |
|---|---|
| MAIN CONTROL ROUTINE MEMORY | 192 |
| MODE SELECTION ROUTINE MEMORY | 194 |
| CALL-SIGNAL REGISTRATION ROUTINE MEMORY | 196 |
| INFORMATION RECEPTION ROUTINE MEMORY | 198 |
| PAGING ROUTINE MEMORY | 200 |
| PAGING CALL-NUMBER STORING ROUTINE MEMORY | 202 |
| FACSIMILE TRANSMISSION ROUTINE MEMORY | 204 |
| ANSWERING MESSAGE STORING ROUTINE MEMORY | 206 |
| RECEIVED MESSAGE OUTPUT ROUTINE MEMORY | 208 |
| INFORMATION-STORED-IN-EMERGENCY OUTPUT ROUTINE MEMORY | 210 |
| OPERATION REPORT OUTPUT ROUTINE MEMORY | 212 |
| CODE-NUMBER REGISTRATION ROUTINE MEMORY | 214 |
| FACSIMILE OPERATION ROUTINE MEMORY | 216 |
| ANSWERING TELEPHONE ROUTINE MEMORY | 218 |
| RECEIVED MESSAGE TRANSMISSION ROUTINE MEMORY | 219 |
| POLLING TRANSMISSION ROUTINE MEMORY | 220 |
| RETRIEVAL TRANSMISSION ROUTINE MEMORY | 222 |
| FACSIMILE RECEPTION ROUTINE MEMORY | 224 |
| TRANSMITTER-IDENTIFYING-INFORMATION STORING ROUTINE MEMORY | 226 |
| TRANSMITTAL-LETTER STORING ROUTINE MEMORY | 228 |
| ⋮ | |

←—124

| REGISTERED-CODE-NUMBER TABLE MEMORY | | |
|---|---|---|
| CODE NUMBER 1 | SIGNAL PATTERN 1 | MEMORY POINTER 1 |
| CODE NUMBER 2 | SIGNAL PATTERN 2 | MEMORY POINTER 2 |
| CODE NUMBER 3 | SIGNAL PATTERN 3 | MEMORY POINTER 3 |
| CODE NUMBER 4 | SIGNAL PATTERN 4 | MEMORY POINTER 4 |
| CODE NUMBER 5 | SIGNAL PATTERN 5 | MEMORY POINTER 5 |
| CODE NUMBER 6 | SIGNAL PATTERN 6 | MEMORY POINTER 6 |
| ⋮ | ⋮ | ⋮ |

TELEPHONE SET

BACKGROUND OF THE INVENTION

1. Field of the Invention

The present invention relates to a telephone set which responds to a plurality of different call signals supplied thereto via a single telephone line.

2. Related Art Statement

There is known a telephone company which offers the service of allotting a plurality of different call numbers to a single telephone line according to a common numbering rule employed thereby.

Subscribers of the telephone company can enjoy this service by using a telephone set or a facsimile machine in relation with each of the different own call numbers. In this case, more telephone sets or facsimile machines may be used with less telephone lines. Otherwise, the subscribers can enjoy the service by using a telephone and facsimile (T/F) apparatus which possesses both the telephone and facsimile functions and has means for automatically switching the T/F apparatus between those two functions. In the latter case, one of the different own call numbers may exclusively be used in relation the telephone function and another of the own call numbers, or the other own call number, may exclusively be used in relation with the facsimile function. An example of the T/F apparatus is disclosed in Japanese Patent Application laid open under Publication No. 4-48855.

The identification of each one of the different own call numbers allotted to the single telephone line, from the other own call numbers, is carried out by supplying, to the single telephone line, different call signals corresponding to the different call numbers, respectively. For example, a basic call signal and a modified call signal obtained by adding a different signal to the basic call signal may be employed to this end. Otherwise, different call signals having different signal patterns may be used.

There is known the "distinctive ringing" service or "dial-in" service wherein different call numbers are identified by different call signals having different signal patterns, respectively. In the distinctive ringing service, the signal pattern of each call signal supplied via a single telephone line to a telephone set is directly utilized by the called telephone set to ring, i.e., produce a calling sound. That is, the ringing device of the telephone set being called produces a calling sound having a sound pattern corresponding to the signal pattern of the call signal supplied thereto. Thus, different calling sounds are produced by a single telephone set in response to different call signals, respectively. The user of the telephone set can identify which call number is being used to call the telephone set, by hearing the sound pattern of the calling sound being produced by the ringing device. According to the distinctive ringing service, a single telephone set functions as if a plurality of telephone sets were used.

For example, in the case where three call numbers are given to a single telephone line, a first and a second one of the three call numbers may be used in relation with the telephone function of a T/F apparatus and the third call number may be used in relation with the facsimile function of the T/F apparatus. If the T/F apparatus is called using the third call number, the facsimile function of the T/F apparatus may automatically receive image information from the calling facsimile machine. If the T/F apparatus is called using the first or second call number, the ringing device of the T/F apparatus produces a calling sound having a sound pattern corresponding to the signal pattern of a supplied call signal identifying the first or second call number. In this particular case, the user of the T/F apparatus may make it a rule that different persons deal with different telephone calls having different calling sounds, respectively, exclusively from each other.

In the above case, it is assumed that the three call numbers allotted to the single telephone line are the number, 1111, for the facsimile function of the T/F apparatus and the numbers, 2222 and 3333, for the telephone function of the same and that the user makes it a rule that Mr. "A" and Mr. "B" share the facsimile number 1111, Mr. "A" exclusively uses the telephone number 2222 and Mr. "B" exclusively uses the telephone number 3333. Mr. "A" lets people know that he uses the number 1111 for the facsimile function and the number 2222 for the telephone function, and similarly Mr. B lets people know that he uses the number 1111 for the facsimile function and the number 3333 for the telephone function. When the T/F apparatus is called using the facsimile number 1111, the facsimile function of the apparatus may automatically receive image information from the calling facsimile machine. When the telephone function of the T/F apparatus is called using one of the two telephone numbers 2222 or 3333, the ringing device of the T/F apparatus produces a calling sound having a sound pattern in accordance with the signal pattern of a supplied call signal identifying the used telephone number 2222 or 3333. Since the respective sound patterns of the calling sounds corresponding to the two telephone numbers are different from each other, Mr. "A" and Mr. "B" can identify who is being called using the corresponding telephone number 2222 or 3333, by hearing the sound pattern of the calling sound being produced by the ringing device.

However, the above-described T/F apparatus suffers from the problem that if Mr. "A" is not available when the T/F apparatus is called using his telephone number 2222, Mr. "B" would have to take the telephone call. Otherwise, if nobody is available, the T/F apparatus would have to be placed in an answering-telephone mode. In the answering telephone mode, however, the T/F apparatus responds in the only and same manner, e.g., transmits the only and same answering message to the calling telephone sets or the calling persons, whichever telephone number 2222 or 3333 may be used to call the T/A apparatus. In those events, therefore, the T/F apparatus functions as if the apparatus had the only and same telephone number in spite of actually having two or more telephone numbers allotted thereto by the telephone company.

U.S. Pat. No. 5,200,992 discloses a facsimile machine which has an outside-line call number allotted thereto according to a first or "public" numbering rule employed by a telephone company, and an extension-line call number allotted thereto according to a second or "private" numbering rule employed by the user of the facsimile machine and other facsimile machines to which the first facsimile machine in question is connected via the extension lines. When the disclosed facsimile machine is called using the outside-line call number by an outside facsimile machine, the called machine transmits the outside-line call number to the calling machine so as to inform that the called machine is receiving image information from the calling machine. Similarly, when the disclosed machine is called using the extension-line call number by another facsimile machine of the user, the called machine transmits the extension-line call number to the calling machine for the same purpose.

However, the above-identified facsimile machine cannot function as if the machine had two or more outside-line call numbers, or two or more extension-line call numbers. When the prior facsimile machine is called via the outside lines, the only and same outside-line call number can be used. Similarly, when the prior facsimile machine is called via the extension lines, the only and same extension-line call number can be used.

SUMMARY OF THE INVENTION

It is therefore an object of the present invention to provide a telephone set which effectively utilizes two or more different own call numbers allotted thereto according to a common numbering rule.

The above object has been achieved by the present invention. According to a first aspect of the present invention, there is provided a telephone set comprising (a) a data obtaining device which obtains a plurality of sets of own-call-number data each set of which identifies a corresponding one of a plurality of different own call numbers allotted to the telephone set according to a common numbering rule, each of the different own call numbers identifying the telephone set from other telephone sets to which other call numbers different from the different own call numbers are allotted according to the common numbering rule, (b) a plurality of memories which are related with the different own call numbers, respectively, and in which a plurality of batches of sound information are stored, respectively, and (c) a transmitter which transmits, to one of the other telephone sets, the batch of sound information stored in one of the memories which corresponds to one of the different own call numbers identified by one of the sets of own-call-number data obtained by the data obtaining device.

In the telephone set constructed according to the first aspect of the invention, the memories are related with the different own call numbers, respectively, and store batches of sound information, respectively, and the transmitter transmits, to one of the other telephone sets, the batch of sound information stored in one of the memories which corresponds to one of the different own call numbers identified by one of the sets of own-call-number data obtained by the data obtaining device. The present telephone set need not have the same number of memories as that of all the own call numbers allotted thereto. In the case where the present telephone set has three or more own call numbers, it may have at least two memories for at least two of the three or more call numbers. The user of the present telephone set can use the single telephone set as if he or she had a plurality of telephone sets having different own call numbers, respectively. It goes without saying that the purchase and running cost of a single telephone set is much lower than that of two or more telephone sets.

According to a preferred feature in accordance with the first aspect of the invention, the data obtaining device comprises a signal detector which detects, as the one set of own-call-number data, one of a plurality of different own call signals each of which is supplied to the telephone set to call the telephone set, the different own call signals identifying the different own call numbers, respectively, the transmitter transmitting the batch of sound information to the one of the other telephone sets which calls the telephone set by using the one of the different own call numbers so that one of the different own call signals which corresponds to the used own call number is supplied to the telephone set and the signal detector detects the one own call signal. The signal detector need not detect or identify all the own call signals corresponding to the own call numbers of the telephone set.

For example, in the case where the telephone set has two own call numbers allotted thereto, the signal detector can identify two call signals corresponding to the two own call numbers, from each other, by detecting either one of the two call signals.

According to another feature in accordance with the first aspect of the invention, the telephone set further comprises a storing device which is operable by a user for storing the batches of sound information in the memories, respectively. The storing device may include a microphone for detecting, as the sound information, a voice message of the user.

According to a second aspect of the present invention, there is provided a telephone set comprising (a) a data obtaining device which obtains a plurality of sets of own-call-number data each set of which identifies a corresponding one of a plurality of different own call numbers allotted to the telephone set according to a common numbering rule, each of the different own call numbers identifying the telephone set from other telephone sets to which other call numbers different from the different own call numbers are allotted according to the common numbering rule, (b) a plurality of received-information memories related with the different own call numbers, respectively, and (c) a receiver which receives a batch of sound information from one of the other telephone sets and stores the received batch of sound information in one of the received-information memories which corresponds to one of the different own call numbers identified by one of the sets of own-call-number data obtained by the data obtaining device.

In the telephone set constructed according to the second aspect of the invention, the received-information memories are related with the different own call numbers, respectively, and the receiver receives a batch of sound information from one of the other telephone sets and stores the received batch of sound information in one of the received-information memories which corresponds to one of the different own call numbers identified by one of the sets of own-call-number data obtained by the data obtaining device. The present telephone set need not have the same number of received-information memories as that of all the own call numbers allotted thereto. In the case where the present telephone set has three or more own call numbers, it may have at least two memories for at least two of the three or more call numbers. The user of the present telephone set can use the single telephone set as if he or she had a plurality of telephone sets having different own call numbers, respectively. In the case where the stored batch of sound information is reproduced by an output device, the time necessary for the reproducing operation is much less than that necessary for a similar operation wherein all the received batches of information are stored in a single memory and all the stored batches of information are reproduced from the single memory by an output device such as a speaker.

According to a preferred feature in accordance with the second aspect of the invention, the telephone set further comprises a plurality of call-number memories which are related with the different own call numbers, respectively, and in which a plurality of call numbers are stored, respectively, and a calling device which calls one of the other telephone sets which has the call number stored in one of the call-number memories which corresponds to the one of the different own call numbers identified by the one of the sets of call-number data. In this case, the telephone set may further comprise a transmitter which transmits, to the called one of the other telephone sets, the batch of sound information stored in the one of the received-information memories.

According to a third aspect of the present invention, there is provided a communication apparatus comprising (a) a data obtaining device which obtains a plurality of sets of own-call-number data each set of which identifies a corresponding one of a plurality of different own call numbers allotted to the communication apparatus according to a common numbering rule, each of the different own call numbers identifying the communication apparatus from other communication apparatuses to which other call numbers different from the different own call numbers are allotted according to the common numbering rule, (b) a plurality of memories which are related with the different own call numbers, respectively, and in which a plurality of batches of information are stored, respectively, and (c) a transmitter which transmits, to one of the other communication apparatuses, the batch of information stored in one of the memories which corresponds to one of the different own call numbers identified by one of the sets of own-call-number data obtained by the data obtaining device.

The communication apparatus in accordance with the third aspect of the invention enjoys the same advantages as those of the telephone set in accordance with the first aspect of the invention. The communication apparatus may be a telephone set, a facsimile machine, or a telephone and facsimile (T/F) apparatus.

According to a preferred feature of the third aspect of the invention, the apparatus further comprises a calling device which calls the one of the other communication apparatuses, the transmitter transmitting the batch of sound information to the called communication apparatus.

According to a fourth aspect of the present invention, there is provided a communication apparatus comprising (a) a data obtaining device which obtains a plurality of sets of own-call-number data each set of which identifies a corresponding one of a plurality of different own call numbers allotted to the communication apparatus according to a common numbering rule, each of the different own call numbers identifying the communication apparatus from other communication apparatuses to which other call numbers different from the different own call numbers are allotted according to the common numbering rule, (b) a plurality of memories related with the different own call numbers, respectively, and (c) a receiver which receives a batch of information from one of the other communication apparatuses and stores the received batch of information in one of the memories which corresponds to one of the different own call numbers identified by one of the sets of own-call-number data obtained by the data obtaining device.

The communication apparatus in accordance with the fourth aspect of the invention enjoys the same advantages as those of the telephone set in accordance with the second aspect of the invention. The communication apparatus may be a telephone set, a facsimile machine, or a T/F apparatus.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings in which:

FIG. 5 is a diagrammatic view of a random access memory (RAM) of the T/F apparatus of FIG. 1;

FIG. 7 is a diagrammatic view of a read only memory (ROM) of the T/F apparatus of FIG. 1;

DETAILED DESCRIPTION OF THE PREFERRED EMBODIMENTS

Figure 1:
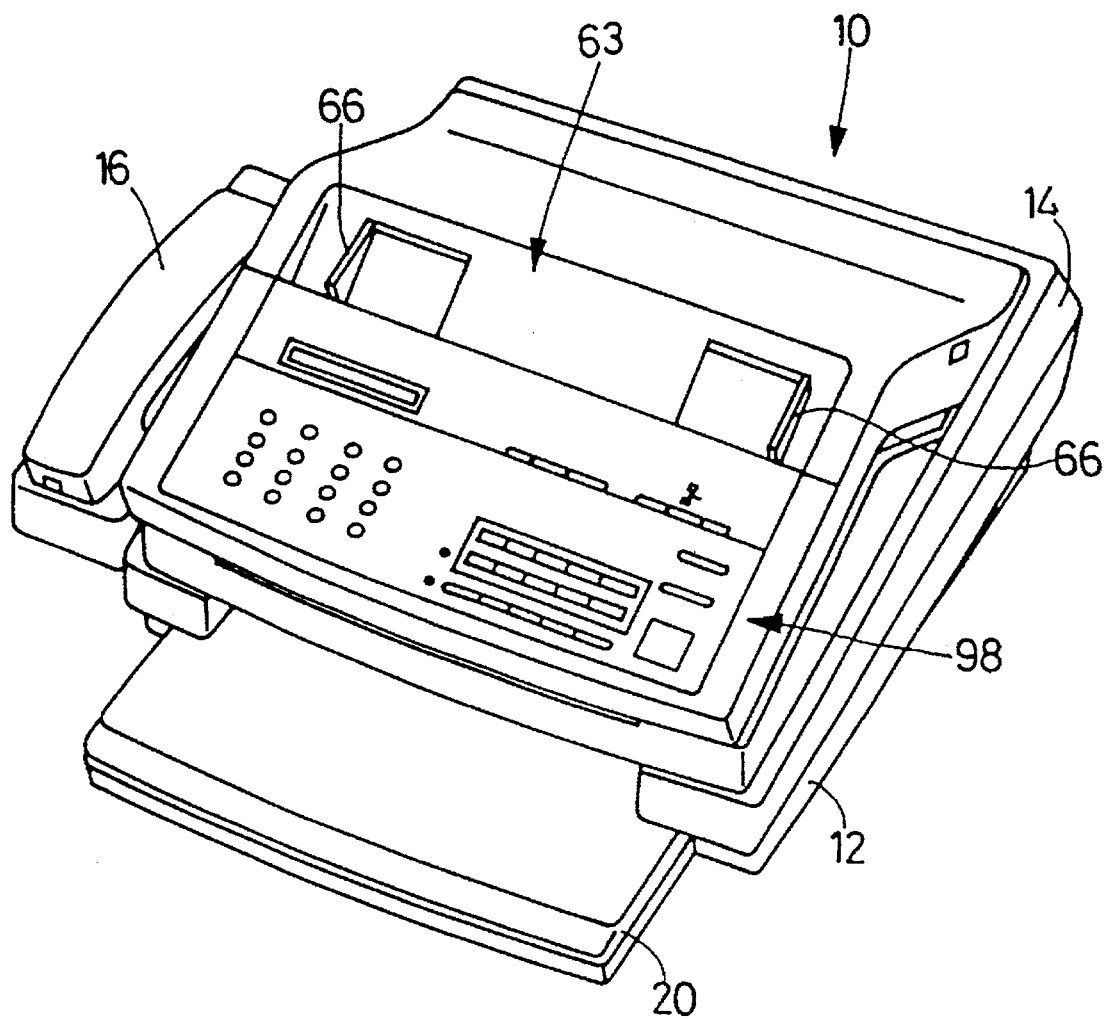
FIG. 1 is a perspective view of an answering telephone and facsimile (T/F) apparatus as a first embodiment of the present invention.

Referring first to FIG. 1, there is shown an answering telephone and facsimile (T/F) apparatus 10 to which the present invention is applied. The present T/F apparatus 10 has two or more own telephone numbers for the telephone set or function thereof, and two or more own facsimile numbers for the facsimile machine or function thereof. Those telephone and facsimile numbers are different from one another, and are allotted to the T/F apparatus 10 according to a common numbering rule employed by a telephone company. This is the "distinctive ringing" service offered by the telephone company. A user of the T/F apparatus 10 is a subscriber of the telephone company.

As shown in FIG. 1, the present T/F apparatus 10 includes a lower housing 12 and an upper housing 14 which cooperate with each other to provide an entire housing of the apparatus 10.

Figure 2:
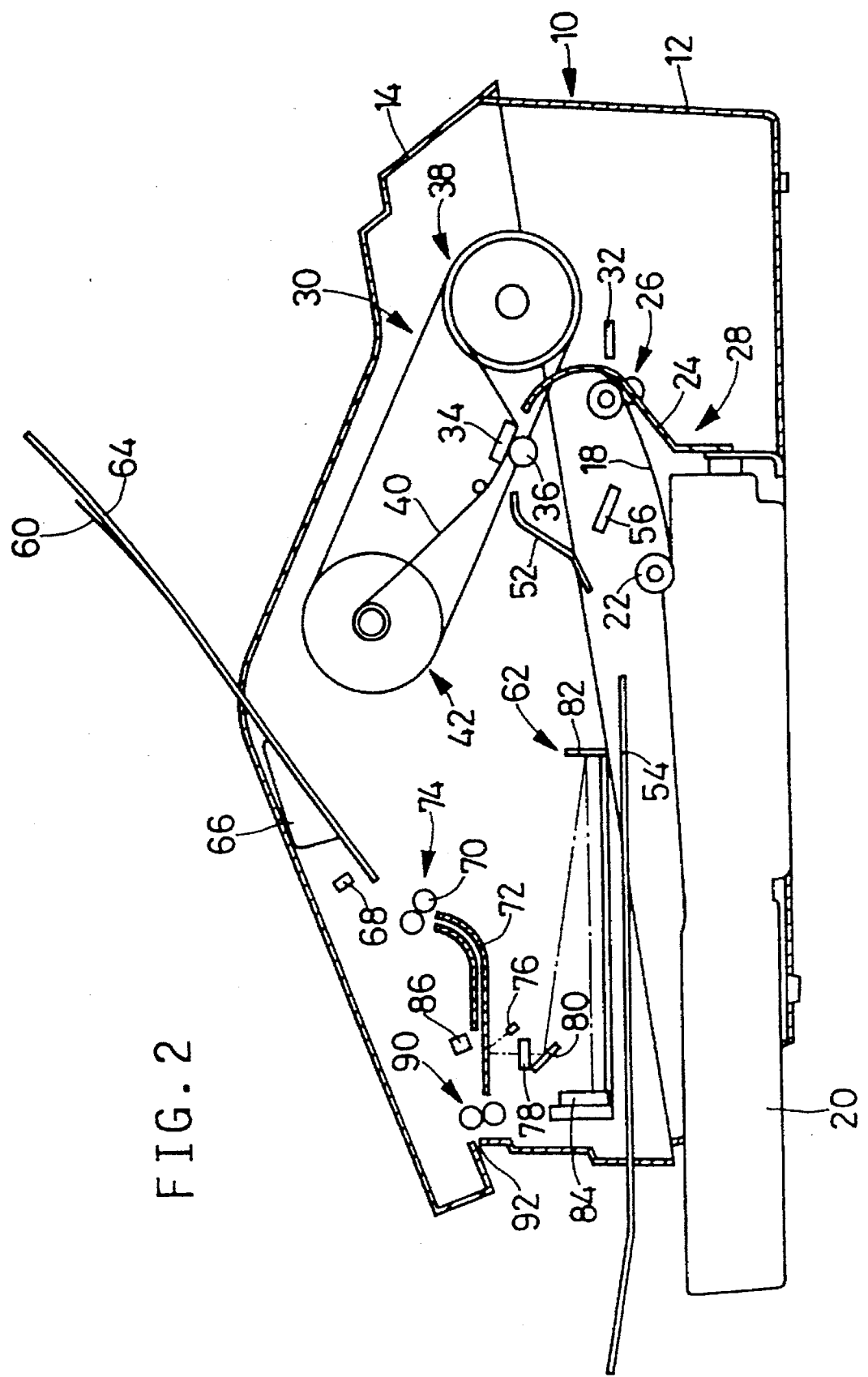
FIG. 2 is a cross-sectional view of the T/F apparatus of FIG. 1.

The T/F apparatus 10 includes a handset 16 which rests on the lower housing 12. As shown in FIG. 2, the lower housing 12 is adapted to receive a sheet cassette 20 which is capable of storing a multiplicity of recording sheets 18 as information-recording media. The recording sheets 18 are taken one by one out of the sheet cassette 20 by a sheet-supplying roller 22, and subsequently each recording sheet 18 is fed to a recording device 30 by a sheet-feeding device 28 which includes a first sheet guide member 24 and a pair of sheet-feeding rollers 26, so that images such as characters, symbols, and/or figures are recorded on the recording sheet 18 by the recording device 30. Reference numeral 32 designates a first sheet-end sensor which detects the leading end of the recording sheet 18 taken from the sheet cassette 20. The time of detection of the leading end of the sheet 18 by the sensor 32 is utilized to determine the time of starting of the image recording on the sheet 18 by the recording device 30.

The recording device 30 is supported by the upper housing 14. The recording device 30 includes a thermal recording head 34, a rotatable platen 36 which is opposed to the recording head 34, and an ink-ribbon device 38. The recording head 34 has a number of heat-generating elements arranged in an array extending perpendicularly to the direction of feeding of the recording sheet 18. The platen 36 is rotatable about a center line thereof by being driven by a drive device (not shown), and the recording sheet 18 is fed forward by the rotation of the platen 36. The ink-ribbon device 38 includes a heat-sensitive ink ribbon 40 having a width corresponding to the effective recording range of the recording head 34, and a ribbon-feeding device 42 for feeding the ink ribbon 40.

While the ink ribbon 40 is fed in synchronism with the feeding of the recording sheet 18, the recording head 34 presses the ink ribbon 40 against the recording sheet 18 on the platen 36, and the heat-generating elements of the head 34 generate heat, when appropriate, so that images are recorded on the sheet 18 with the ink thermally fused on the ribbon 40. The image-recorded sheet 18 is fed to a sheet tray 54 by being guided by a second sheet guide member 52. Thus, the image-recorded sheet 18 is discharged from the T/F apparatus 10. Reference numeral 56 designates a second sheet-end sensor which detects the trailing end of the image-recorded sheet 18. In the case where two or more recording sheets 18 are used in series, the second sheet 18 following the first sheet 18 is taken out of the sheet cassette 20 after the second sensor 56 has detected the trailing end of the first sheet 18. Thus, the occurrence of jamming of the second sheet 18 is effectively prevented.

The present T/F apparatus 10 also includes a reading device 62 which reads, from an original sheet 60, original images to be transmitted to a calling or called facsimile machine as described later. The reading device 62 is supported by the upper housing 14. The original 60 is set on an original support member 64 which is detachable from an original inlet 63 of the upper housing 14. The original 60 set on the support member 64 is guided by, and between, a pair of first original guide members 66, 66 shown in FIG. 1. An original sensor 68 supported by the upper housing 14 identifies whether any original sheet 60 remains on the support member 64. A plurality of original sheets 60 are fed one by one to the reading device 62 by an original-feeding device 74 which includes a pair of original-feeding rollers 70 and a second original guide member 72.

The reading device 62 includes a light source 76 which emits light toward the original 60, a lens 78 which converges the light reflected from the original 60, a first and a second mirror 80, 82 each of which reflects the light converged by the lens 78, and a line-image sensor 84 which receives the light incident thereto from the second mirror 82. The line-image sensor 84 intermittently reads each line of image from the original 60 while the original 60 is fed by the original-feeding device 74. Reference numeral 86 designates a third sheet-end sensor which detects the leading end of the original 60. The time of detection of the leading end of the original 60 by the sensor 86 is utilized to control the line-image reading operation of the sensor 84. After the original images have been read from the original 60, the original 60 is fed to a pair of original-discharging rollers 90 and is discharged, out of the T/F apparatus 10, from an original outlet 92 of the upper housing 14.

Figure 3:
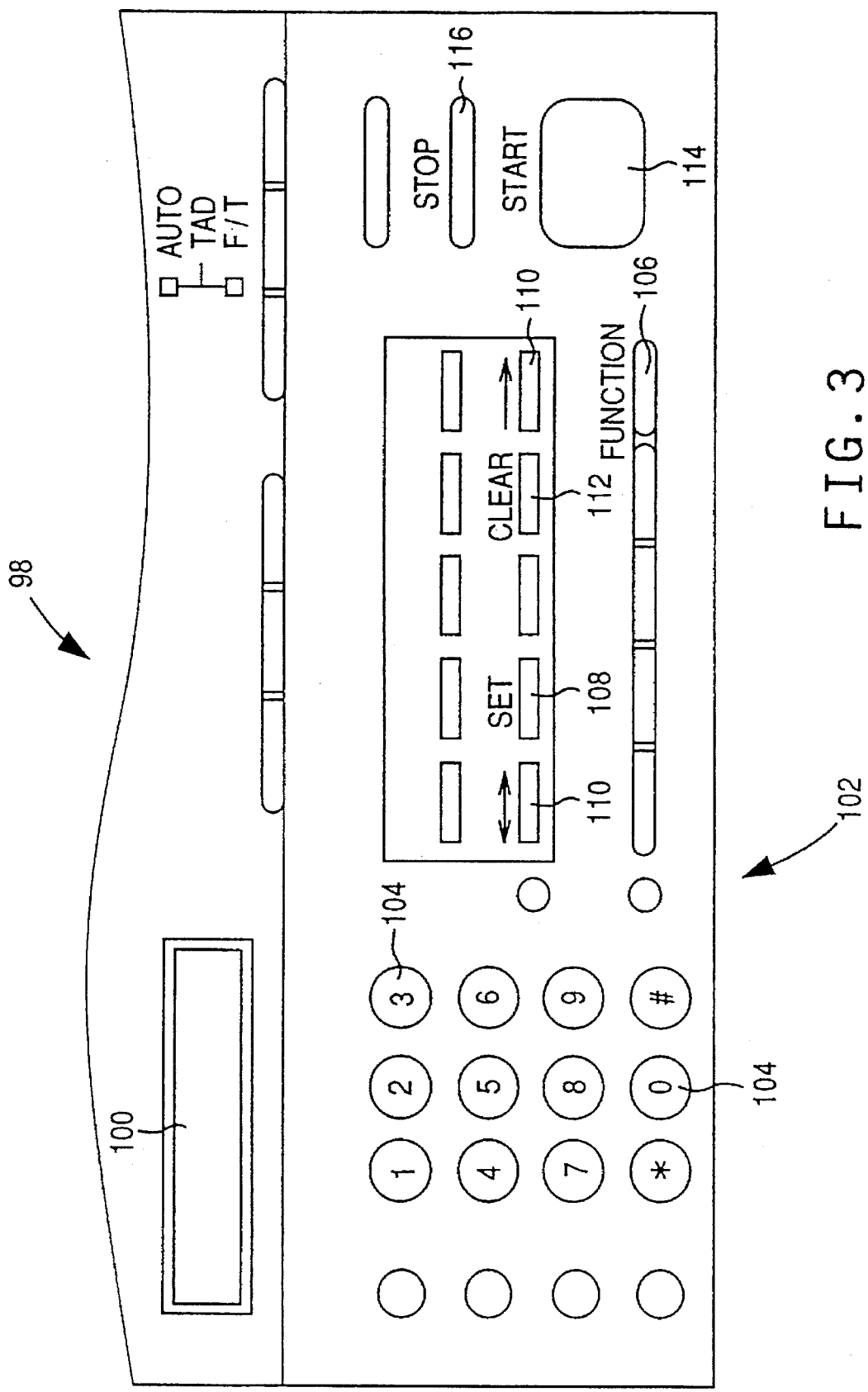
FIG. 3 is a view of an operator panel of the T/F apparatus of FIG. 1.

As shown in FIG. 1, an operator panel 98 is provided on the top of the upper housing 14. As shown in FIG. 3, the operator panel 98 includes a liquid crystal display (LCD) 100 and a keyboard 102. The keyboard 102 includes numeral keys (labelled "0" to "9", "X", and "#") 104, a function key ("FUNCTION") 106, a set key ("SET") 108, two cursor keys ("←" and "→") 110, 110, a clear key ("CLEAR") 112, a start key ("START") 114, and a stop key ("STOP") 116.

The FUNCTION key 106 is pushed by a user to start displaying, on the LCD 100, the respective names of various operation modes which are selectable on the present T/F apparatus 10. The cursor keys 110 are primarily used to move a cursor (not shown) rightward or leftward on the LCD 100, and each of the cursor keys 110 is additionally used to provisionally select the mode whose name is currently displayed on the LCD 100, in a manner described later. The SET key 108 is used to finally establish or fix the provisional selection of the mode by the cursor key 110. The CLEAR key 112 is used to cancel the provisional selection of the mode by the cursor key 110. The START key 114 is used to command the T/F apparatus 10 to register an own call signal corresponding to an own call number of the apparatus 10, in a manner described later. The STOP key 116 is used to command the apparatus 10 to quit registering an own call signal.

Figure 4:
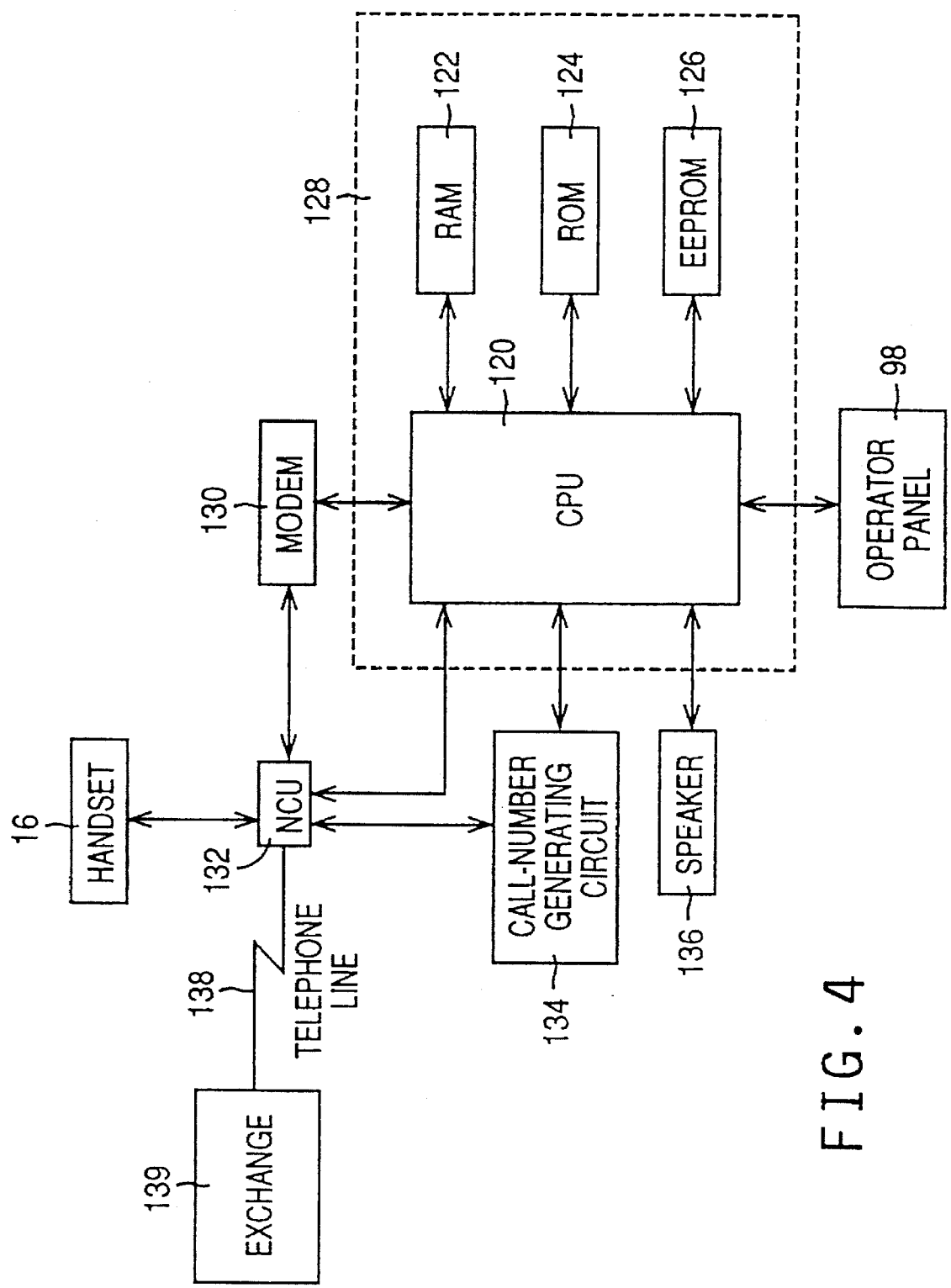
FIG. 4 is a diagrammatic view of the construction of the T/F apparatus of FIG. 1.

As shown in FIG. 4, the present T/F apparatus 10 has a computer 128 which includes a central processing unit (CPU) 120 and additionally includes a random access memory (RAM) 122, a read only memory (ROM) 124, and an electrically erasable and programmable read only memory (EEPROM) 126 each of which is connected to the CPU 120. Various operations of the T/F apparatus 10 are carried out by the computer 128. The CPU 120 of the computer 128 is connected to a modem 130, a network control unit (hereinafter, referred to as "NCU") 132, the operator panel 98, a call number-generating circuit 134, and a speaker 136. The NCU 132 is connected, via a single telephone line 138 as an external communication line, to an exchange 139 of the previously-mentioned telephone company. The T/F apparatus 10 is connected via the exchange 139 to other telephone sets and other facsimile machines to which other telephone numbers different from the own telephone numbers of the T/F apparatus 10 and other facsimile numbers different from the own facsimile numbers of the apparatus 10 are allotted according to the common numbering rule employed by the telephone company.

As shown in FIG. 5, the RAM 122 includes an identified code-number memory 140, a selected-mode memory 142, a code-number-related memory 144, a transmission memory 148, a reception memory 150, an input code-number memory 152, a recording memory 154, a reading memory 156, a first and a second signal-pattern memory 158, 160, a prior and a current signal-state memory 162, 164, a first, a second, and a third counter 166, 168, 170, and a first, a second, and a third flag F1, F2, F3.

The identified code-number memory 140 temporarily stores a code number corresponding to an own call signal, when the T/F apparatus 10 receives the own call signal from the exchange 139 via the telephone line 138. As described previously, four or more different own call numbers including two or more different own telephone numbers and two or more different own facsimile numbers are allotted to the present, single T/F apparatus 10 according to the common numbering rule employed by the telephone company. The exchange 139 of the telephone company supplies, to the T/F apparatus 10, four or more different own call signals corresponding to the four or more different own call numbers of the apparatus 10, respectively. The four or more own call signals have different signal patterns and are identifiable from each other. When the T/F apparatus 10 is called using one of the own call numbers of the apparatus 10 by a user of one of other communication apparatuses (e.g., other telephone sets, other facsimile machines, and other T/F apparatuses), the exchange 139 supplies a corresponding own call signal to the apparatus 10 to call the apparatus 10. Different call numbers different from the four or more different own call numbers of the T/F apparatus 10 are allotted to the above-indicated other communication apparatuses according to the common numbering rule employed by the telephone company. When the user registers, in the T/F apparatus 10, one or more of the four or more own call signals corresponding to the four or more own call numbers of the apparatus 10, he or she is required to register, in the apparatus 10, one or more code numbers corresponding to the one or more own call signals registered, respectively, in a call-signal registration mode described later.

The selected mode memory 142 stores mode data representing one or more operation modes which are currently selected on the T/F apparatus 10.

The code-number related memory 144 includes (a) a registered-code-number related memory 144a which stores various sorts of information in relation with each of one or more code numbers registered on the T/F apparatus 10, i.e., each of one or more own call signals registered on the apparatus 10, and (b) a non-registered-code-number related memory 144b which stores various sorts of information in relation with all numbers which have not been registered as code numbers on the apparatus 10, i.e., the other own call signals which have not been registered on the apparatus 10 but which will be able to be registered on the apparatus 10. The non-registered-code-number related memory 144b is originally provided in the T/F apparatus 10, and remains even after all the own call signals have been registered on the apparatus 10.

The transmission memory 148 temporarily stores information to be transmitted by the T/F apparatus 10, without any relation with a specific code number, i.e, a specific own call number.

The reception memory 150 temporarily stores information which has been received by the T/F apparatus 10, without any relation with a specific code number or own call number.

The input code-number memory 152 temporarily stores a code number when the user inputs the code number in the T/F apparatus 10.

The recording memory 154 temporarily stores, before recording by the recording device 30, image information which has been received and decoded by the T/F apparatus 10.

The reading memory 156 temporarily stores image data which have been read from the original 60 by the reading device 62.

The first and second signal-pattern memories 158, 160, prior and current signal-state memories 162, 164, first to third counters 166, 168, 170, and first to third flags F1, F2, F3 are used in the call-signal registration mode described later, and those memories will be detailed in the description of that mode.

Figure 6:
FIG. 6 is a diagrammatic view of a code number-related memory of the RAM of FIG. 5.

As shown in FIG. 6, the non-registered-code-number related memory 144b of the code-number related memory 144 includes, commonly for all non-registered code numbers, i.e., all the non-registered own call signals, an answering message memory 172, a received message memory 174, a paging call-number memory 176, a paging flag 178, a remote-control code memory 180, an in-emergency information storing memory 182, a retrieval-permitting information storing memory 184, a transmitter-identifying information memory 186, a transmittal-letter memory 188, and an operation data memory 190.

Each registered-code-number related memory 144a of the code-number related memory 144 includes, for a corresponding code number, i.e., a corresponding own call signal, each registered in the T/F apparatus 10, various memories 172–190 which are identical with the above-described memories 172–190 of the non-registered-code-number related memory 144b.

Each answering message memory 172 stores an answering message which is to be transmitted by the T/F apparatus 10 in an answering telephone mode described later.

Each received message memory 174 stores a message which has been received by the T/F apparatus 10 in the answering telephone mode.

Each paging call-number memory 176 stores a call number of a communication apparatus which is called or paged by the T/F apparatus 10 to inform a user of the paged apparatus, of the fact that the apparatus 10 has received a message and stored it in a corresponding received message memory 174.

Each paging flag 178 is referred to in judging whether or not to page a communication apparatus whose call number is stored in a corresponding paging call-number memory 176.

Each remote-control code memory 180 stores a remote-control code which is compared with a command code (e.g., DTMF (dual tone multifrequency) signal) which is transmitted from a calling telephone set to cause the T/F apparatus 10 to carry out a pre-scribed operation which will be described later.

Each in-emergency information storing memory 182 (hereinafter, referred to as the "emergency memory" 182) automatically stores information which is received by the T/F apparatus 10 when the recording sheets 18 have been used up, i.e., when no recording sheet 18 remains in the sheet cassette 20.

Each retrieval-permitting information storing memory 184 (hereinafter, referred to as the "retrieval memory" 184) stores information which is received by the T/F apparatus 10 in a retrieval reception mode thereof wherein the received information is not recorded on the recording sheets 18 but is stored in this memory 184.

Each transmitter-identifying information memory 186 stores image information identifying a facsimile transmitter, such as a corresponding code number, or a corresponding own facsimile number, each registered on the T/F apparatus 10. The transmitter-identifying information stored in the form of image information is easily coded and added to the information to be transmitted by the apparatus 10, whichever coding method may be used for the information transmission.

Each transmittal-letter memory 188 stores image information representing a letter of transmittal which is automatically added to the information to be transmitted by the T/F apparatus 10. The transmission information may be image information representing the original images obtained from the original 60. The transmittal letter stored in the form of image information is easily coded each time the transmittal letter is transmitted by the apparatus 10.

Each operation data memory 190 stores operation data relating to the information receiving and transmitting operations of the facsimile machine of the T/F apparatus 10 in relation with a corresponding registered code number, i.e., a corresponding registered own facsimile number of the apparatus 10. For example, the memory 190 stores, as the operation data, one or more of (a) the date and time-of-day of information reception or transmission, (b) the facsimile number of an information transmitter or receiver, (c) the time duration of information reception or transmission, (d) the number of the recording sheets 18 used, (e) the result (success or failure) of information reception or transmission, and (f) the charge or fee of information reception or transmission.

As shown in FIG. 7, the ROM 124 includes a main control routine memory 192, a mode selection routine memory 194, a call-signal registration routine memory 196, an information reception routine memory 198, a paging routine memory 200, a paging call-number storing routine memory 202, a facsimile transmission routine memory 204, an answering message storing routine memory 206, a received message output routine memory 208, an information-stored-in-emergency output routine memory 210, an operation report output routine memory 212, a code-number registration routine memory 214, a facsimile operation routine memory 216, an answering telephone routine memory 218, a received message transmission routine memory 219, a polling transmission routine memory 220, a retrieval transmission routine memory 222, a facsimile reception routine memory 224, a transmitter-identifying-information storing routine memory 226, and a transmittal-letter storing routine memory 228.

The main control routine memory 192 stores a main control program or routine to control the overall operation of the T/F apparatus 10, including switching the apparatus 10 between the telephone and facsimile functions thereof.

The mode selection routine memory 194 stores a control routine to control the T/F apparatus 10 when the user selects one or more of the various operation modes of the apparatus 10.

The call-signal registration routine memory 196 stores a control routine to control the T/F apparatus 10 when the user registers one or more of the own call signals corresponding to the own call numbers of the apparatus 10 and one or more code numbers corresponding to the one or more own call signals registered, respectively.

The information reception routine memory 198 stores a control routine to control the T/F apparatus 10 to receive information in relation with each registered own call signal, i.e., registered own call number corresponding to the registered own call signal.

The paging routine memory 200 stores a control routine to control the T/F apparatus 10 to inform a user of a communication apparatus having a pre-stored paging call number, of the fact that the apparatus 10 has received and stored a voice message.

The paging call-number storing routine memory 202 stores a control routine to control the T/F apparatus 10 when the user stores a paging call number of a communication apparatus to be paged, in relation with each registered code number, i.e., registered own call number corresponding to the registered code number.

The facsimile transmission routine memory 204 stores a control routine to control the T/F apparatus 10 to transmit image information representing the original images read from the original 60 set on the original support member 64.

The answering message storing routine memory 206 stores a control routine to control the T/F apparatus 10 when the user stores an answering voice message in relation with each registered code number.

The received message output routine memory 208 stores a control routine to control the T/F apparatus 10 when the user operates the apparatus 10 to output a received voice message via the speaker 136.

The information-stored-in-emergency output routine memory 210 stores a control routine to control the T/F apparatus 10 when the user operates the apparatus 10 to record the image information which had automatically been stored when no recording sheet 18 remained in the sheet cassette 20, on recording sheets 18 newly supplied.

The operation report output routine memory 212 stores a control routine to control the T/F apparatus 10 when the user wishes the apparatus 10 to record, on the recording sheets 18, an operation report concerning the information receiving and transmitting operations of the facsimile machine of the apparatus 10, in relation with each registered code number.

The code-number registration routine memory 214 stores a control routine to control the T/F apparatus 10 when the user registers a code number corresponding to an own call signal being registered in the apparatus 10.

The facsimile operation routine memory 216 stores a control routine to control the T/F apparatus 10 to automatically receive or transmit image information in relation with each registered own call signal.

The answering telephone routine memory 218 stores a control routine to control the T/F apparatus 10 to automatically transmit, in relation with each registered own call signal, an answering voice message when the apparatus 10 in the answering telephone mode thereof receives a voice message from a user of a calling telephone set.

The received message transmission routine memory 219 stores a control routine to control the T/F apparatus 10 to automatically transmit, in relation with each registered own call signal, a received and stored voice message when the apparatus 10 in the answering telephone mode thereof receives a command code from a calling telephone set. The voice message is transmitted to the calling telephone set.

The polling transmission routine memory 220 stores a control routine to control the T/F apparatus 10 to automatically transmit, in relation with each registered own call signal, the image information representing the original images of the original 60 currently set on the original support member 64, when the apparatus 10 in a polling transmission mode thereof receives a command code from a calling facsimile machine. The image information is transmitted to the calling facsimile machine.

The retrieval transmission routine memory 222 stores a control routine to control the T/F apparatus 10 to automatically transmit, in relation with each registered own call signal, the image information which has been stored in a corresponding retrieval memory 184, when the apparatus 10 in a retrieval transmission mode thereof receives a command code from a calling facsimile machine. The image information is transmitted to the calling facsimile machine.

The facsimile reception routine memory 224 stores a control routine to control the T/F apparatus 10 to automatically receive image information in relation with each registered own call signal.

The transmitter-identifying information storing routine memory 226 stores a control routine to control the T/F apparatus 10 when the user stores, in relation with each registered code number, the image data identifying a facsimile transmitter which transmits image information to which this image information is added. The identification information may comprise one of the own call numbers which corresponds to each registered code number, and/or the registered own code number itself.

The transmittal-letter storing routine memory 228 stores a control routine to control the T/F apparatus 10 when the user stores, in relation with each registered code number, the image information representing a letter of transmittal which is added to the image information (e.g., original images) to be transmitted by the apparatus 10.

Figures 8, 9:
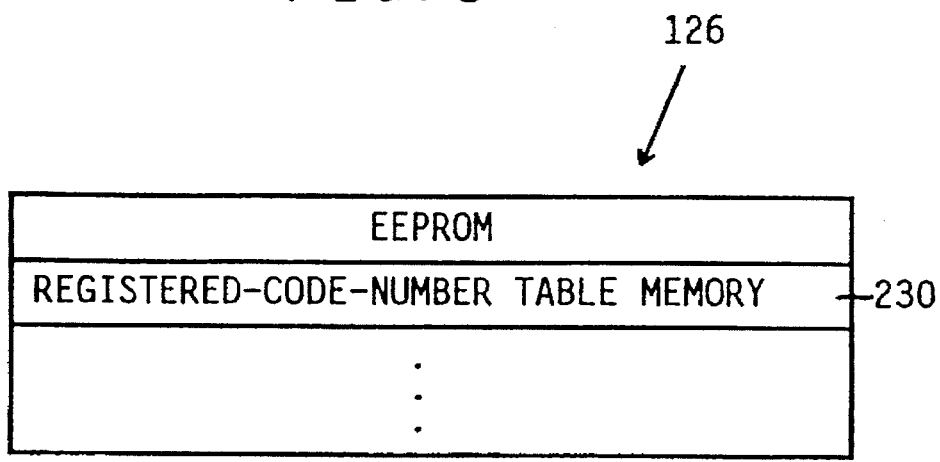
FIG. 8 is a diagrammatic view of an EEPROM (electrically erasable and programmable ROM) of the T/F apparatus of FIG. 1.
FIG. 9 is a diagrammatic view of a registered-code-number table memory of the EEPROM of FIG. 8.

As shown in FIG. 8, the EEPROM 126 includes a registered-code-number table memory 230.

As shown in FIG. 9, the registered-code-number table memory 230 stores, together with and in relation with each registered code number, (a) the signal pattern of a corresponding registered own call signal and (b) a memory pointer indicating the respective addresses of the various memories 172–190 of a corresponding registered-code-number related memory 144a. When the user inputs a registered code number through the operator panel 98 into the T/F apparatus 10, the computer 128 automatically selects one or more of the memories 172–190 corresponding to the input code number. Based on the signal pattern of a registered own call signal received and detected by the apparatus 10, the computer 128 automatically identifies a corresponding registered code number from the table memory 230.

The modem 130 includes a modulating and demodulating mechanism which modulates digital signals into analog signals which in turn are sent out via the NCU 132 to the telephone line 138, and which demodulates analog signals supplied from the telephone line 138, into digital signals. The modem 130 also includes a sound-digitizing mechanism which converts sound analog signals into sound digital signals and a sound-reproducing mechanism which reproduces sound analog signals from sound digital signals.

The NCU 132 has a dialing function and a signal-detecting function, so that the NCU 132 transmits signals in a manner compatible with the telephone line 138 and detects signals supplied from the telephone line 138. Thus, the NCU 132 mediates information between the modem 130 and the telephone line 138.

The handset 16 is connected to the NCU 132, so that the user of the T/F apparatus 10 may talk, through the handset 16, with a user of a calling or called telephone set.

The operator panel 98 may be used by the user to input various sorts of information into the T/F apparatus 10 while the computer 128 carries out one or more of the various control routines pre-stored in the ROM 124. The operator panel 98 displays information as an output of the computer 128.

The call-number-generating circuit 134 generates or produces a call number to call another telephone set or facsimile machine. When the user inputs a call number through the operator panel 98, the CPU 120 supplies the input call number to the generating circuit 134. When the T/F apparatus 10 in the answering telephone mode pages another communication apparatus having a paging call number stored in a paging call-number memory 176 corresponding to a registered call signal or code number, the CPU 120 automatically reads in the stored paging call number of that communication apparatus from the corresponding paging call-number memory 176, so that the CPU 120 supplies the paging call number to the generating circuit 134. The generating circuit 134 generates information representing the call number supplied from the CPU 120, so that the call-number information is supplied to the telephone line 138 via the NCU 132.

The speaker 136 is controlled by the CPU 120 to output a received sound message stored in a received message memory 174 corresponding to a registered code number input by the user through the operator panel 98.

The present T/F apparatus 10 serves as both an answering telephone set and a facsimile machine. Next, there will be described the structural features of the apparatus 10 for serving as the answering telephone set, by reference to the diagrammatic view of FIG. 10, and the structural features of the same 10 for the facsimile machine by reference to the diagrammatic view of FIG. 11.

Figure 10:
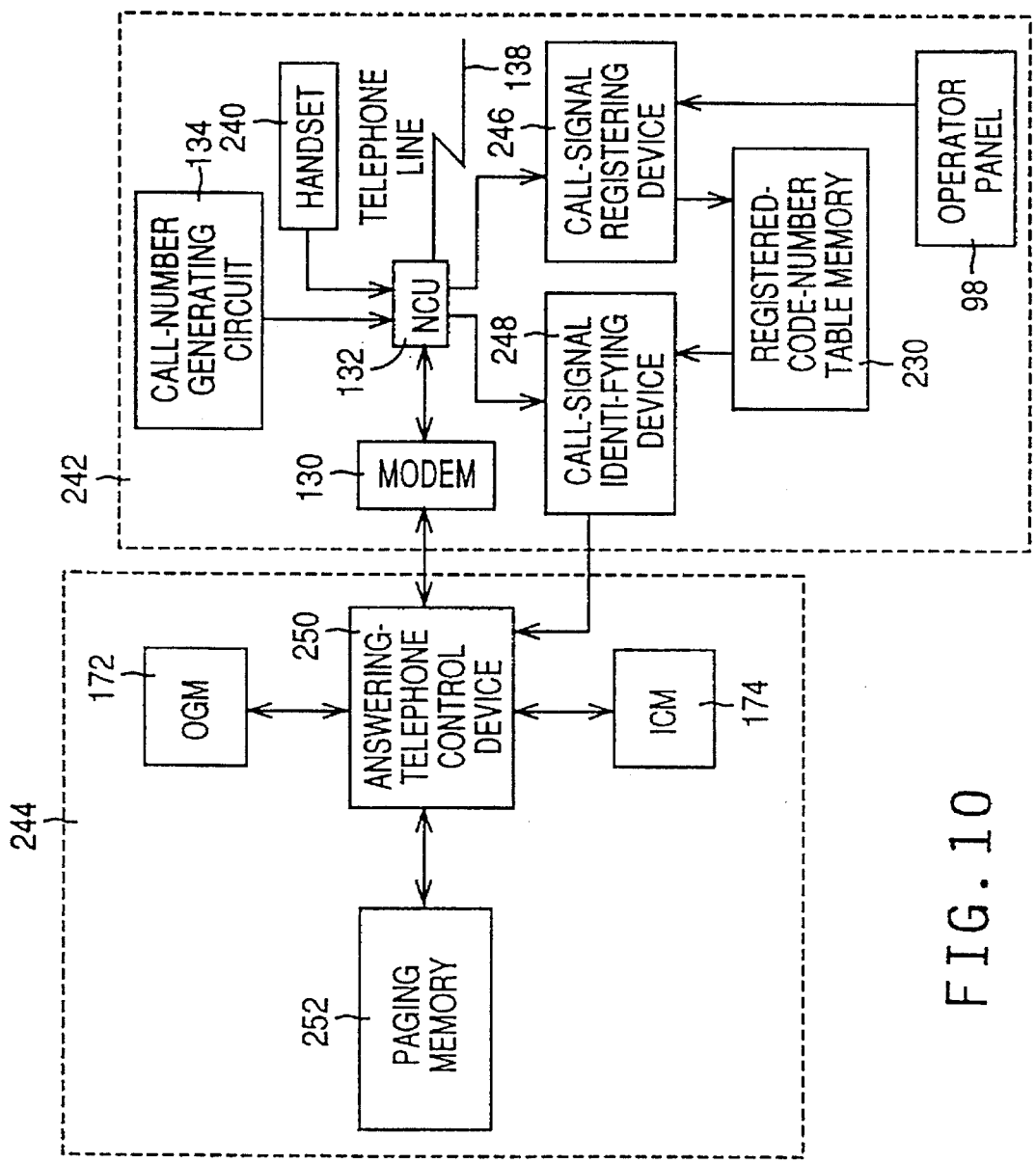
FIG. 10 is a diagrammatic view of an answering telephone set or function of the T/F apparatus of FIG. 1.

As shown in FIG. 10, the answering telephone set of the T/F apparatus 10 includes a signal-processing part 242 and an answering-telephone part 244. The signal-processing part 242 receives signals from, and transmits signals to, the telephone line 138, and can identify or register an own call signal supplied to the apparatus 10. The answering-telephone part 244 operates for carrying out the various answering-telephone operations of the apparatus 10 in response to an own call signal received by the signal-processing part 242.

The signal-processing part 242 includes the NCU 132 connected to the telephone line 138, the modem 130, the handset 16, the call-number generating circuit 134, a call-signal registering device 246, a call-signal identifying device 248, the operator panel 98 connected to the signal registering device 246, and the registered-code-number table memory 230 connected to the signal registering device 246 and the signal identifying device 248.

The call-signal registering device 246 operates for registering an own call signal detected by the NCU 132, and the call-signal identifying device 248 identifies an own call signal detected by the NCU 132.

The NCU 132 detects an own call signal supplied from the telephone line 138, and sends the signal information to the handset 16, the signal registering device 246, and the signal identifying device 248. If the user picks up the handset 16 when the NCU 132 is detecting the call signal, the user can talk with a user of a calling telephone set. In the case where nobody picks up the handset 16, if the T/F apparatus 10 is currently placed in the call-signal registration mode, the signal registering device 246 carries out the call-signal registration program or routine stored in the memory 196. On the other hand, if not, the signal identifying device 248 carries out the information reception routine stored in the memory 198.

The signal registering device 246 is connected to the operator panel 98 and the registered-code-number table memory 230. If a code number is input through the operator panel 98 when an own call signal corresponding to one of the own call numbers allotted to the T/F apparatus 10 by the telephone company is being detected by the NCU 132 in the signal-code registration mode, the code number input is automatically registered in relation with the signal pattern of the call signal in the table memory 230 according to the signal-code registration routine.

The registered-code-number table memory 230 is connected to the signal identifying device 248. The code number or numbers registered in the table memory 230 is/are referred to by the signal identifying device 248 according to the information reception routine, so that a registered code number corresponding to an own call signal detected by the NCU 132 is identified in the table memory 230 and the identified code number is supplied to the answering-telephone part 244.

The answering-telephone part 244 is connected to the modem 130, so that the telephone part 244 receives or transmits information from or to the telephone line 138 via the NCU 132 and the modem 130.

The answering-telephone part 244 includes an answering-telephone control device 250 which controls, in relation with each code number supplied from the signal identifying device 248, the T/F apparatus 10 for reading an answering message from a corresponding memory 172, storing a received message in a corresponding memory 174, and/or paging a communication apparatus having a paging call number stored in a corresponding memory 176 so as to inform that the apparatus 10 has stored the received message in the corresponding memory 174. The answering-telephone part 244 has a paging memory 252 which includes the paging flags 178 as well as the paging call-number memories 176 all for the registered and non-registered own code signals supplied to the T/F apparatus 10. The answering message memories 172 are indicated at "OGM (outgoing message)" and the received message memories 174 are indicated at "ICM (incoming message)", in FIG. 10.

Figure 11:
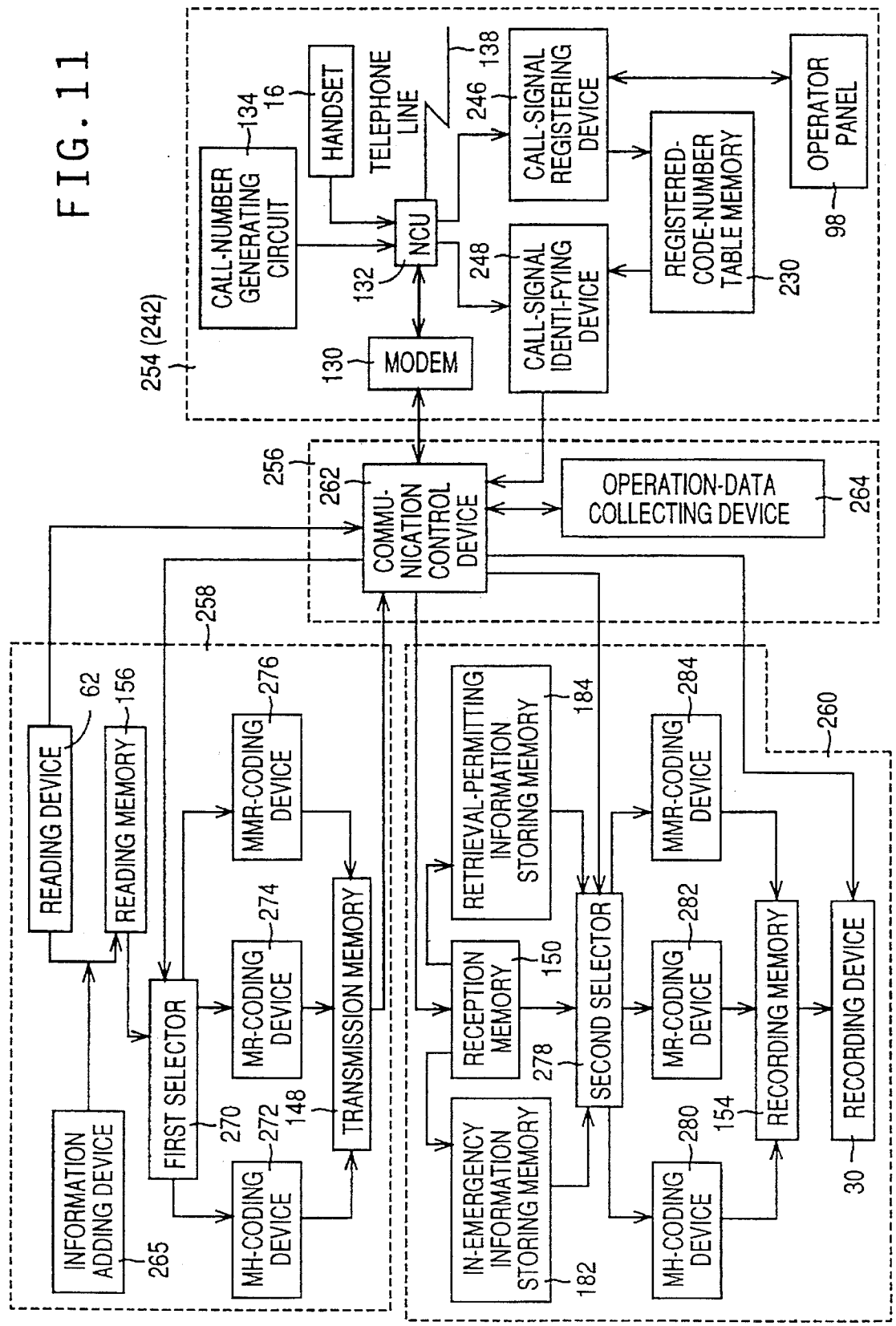
FIG. 11 is a diagrammatic view of a facsimile machine or function of the T/F apparatus of FIG. 1.

As shown in FIG. 11, the facsimile machine of the T/F apparatus 10 includes a signal-processing part 254, a communication control part 256, an information-transmitting part 258, and an information-receiving part 260.

The signal-processing part 254 of the facsimile machine is the same as the signal-processing part 242 of the telephone set shown in FIG. 10. That is, the T/F apparatus 10 employs the signal-processing part 242 (254) for both the telephone and facsimile functions. A repetitive description of the signal-processing part 254 is omitted. The code number or numbers registered in the registered-code-number table memory 230 is/are referred to by the call-signal identifying device 248 according to the information reception routine, so that a registered code number corresponding to an own call signal detected by the NCU 132 is identified and the identified code number is supplied to the communication control part 256. The control part 256 is connected to the modem 130, so that the control part 256 receives or transmits information from or to the telephone line 138 via the NCU 132 and the modem 130. The control part 256 controls the information transmitting and receiving parts 258, 260 based on each identified code number supplied from the signal identifying device 248 and information supplied from the modem 130.

The communication control part 256 includes a communication control device 262 and an operation-data collecting device 264. The control device 262 controls the information transmitting and receiving parts 258, 260, and the collecting device 264 collects and stores operation data including various parameters relating to the information receiving and transmitting operations of the facsimile machine of the T/F apparatus 10.

The information transmitting part 258 includes an information adding device 265, the reading device 62, the reading memory 156, a first selector 270, an MH-coding device 272, an MR-coding device 274, an MMR-coding device 276, and the transmission memory 148.

The information adding device 265 operates for adding transmitter-identifying information (e.g., code number) and/or a letter of transmittal, each corresponding to a code number supplied from the signal-processing part 254, to image information which has been read by the reading device 62 and which is to be transmitted to another facsimile machine. The reading memory 156 stores image information representing the original images read by the reading device 62. The first selector 270 is controlled to select one of three different image-information coding methods corresponding to the three coding devices 272–276, respectively. The communication control device 262 controls the first selector 270 to select one of the three coding devices 272–276, based on information which is supplied from a calling or called facsimile machine and which represents a decoding method employed by the facsimile machine.

The MH-, MR-, or MMR-coding device 272–276 codes and compresses image information in a corresponding coding method, respectively. The transmission memory 148 temporarily stores transmission information which has been coded by the coding device 272–276. The information adding device 265 adds, to the image information obtained by the reading device 62, image information representing additional information including transmitter-identifying information and/or a letter of transmittal corresponding to each code number supplied from the signal-processing part 254. The reading memory 156 temporarily stores the transmission information including the additional information. One of the three coding devices 272–276 selected by the first selector 270 codes the transmission information. After having temporarily been stored in the transmission memory 148, the transmission information is sent out to the telephone line 138 via the communication control part 256 and the signal processing part 254.

The information receiving part 260 includes the reception memory 150, the in-emergency information storing memories 182, the retrieval-permitting information recording memories 184, a second selector 278, an MH-decoding device 280, an MR-decoding device 282, an MMR-decoding device 284, the recording memory 154, and the recording device 30.

The second selector 278 is controlled by the communication control device 262 to select one of three different image-information decoding methods corresponding to the three decoding devices 280–284, respectively. The control device 262 controls the second selector 278 to select one of the three decoding devices 280–284, so as to decode the coded information received and stored in the memory 150, 182, or 184 and record the decoded information on the recording sheets 18. One of the three decoding devices 280–284 is selected based on information which is supplied from a calling or called facsimile machine and which represents a coding method employed by the facsimile machine.

The MH-, MR-, or MMR-decoding device 280–284 decodes the received information which had been coded in an MH-, an MR-, or an MMR-coding method, respectively. The recording device 30 records, on the recording sheets 18, the decoded information stored in the recording memory 154.

The reception memory 150 temporarily stores the received coded information supplied from the telephone line 138 via the communication control device 262. In the case where some recording sheets 18 remain and the T/F apparatus 10 is not placed in a retrieval-permitting information storing mode, the control device 262 controls the second selector 278 to select an appropriate one of the three decoding devices 280–284 to decode the information stored in the reception memory 150. The decoded information is stored in the recording memory 154, and then recorded on the recording sheets 18 by the recording device 30.

In the case where the information-receiving part 260 receives information while the T/F apparatus 10 is placed in either an in-emergency information storing state or the retrieval-permitting information storing mode, the received information is stored in the memory 182, or the memory 184, in relation with a code number corresponding to an own call signal identified by the signal-processing part 254. If the received own call signal corresponds to a registered code number, the received information is stored in a corresponding memory 182 or memory 184 of the registered-code-number related memory 144a. On the other hand, if the received own call signal is not a registered one, i.e., a non-registered one, the received information is stored in the memory 182 or memory 184 of the non-registered-code-number related memory 144b. The received information stored in the memory 144a or memory 144b is maintained until the control device 262 issues a control command to the recording device 30 to read the information therefrom and record the same on the recording sheets 18.

There will be described the various operations of the present T/F apparatus 10 constructed as described above, by reference to the flow charts of FIGS. 12–32.

Figure 12:
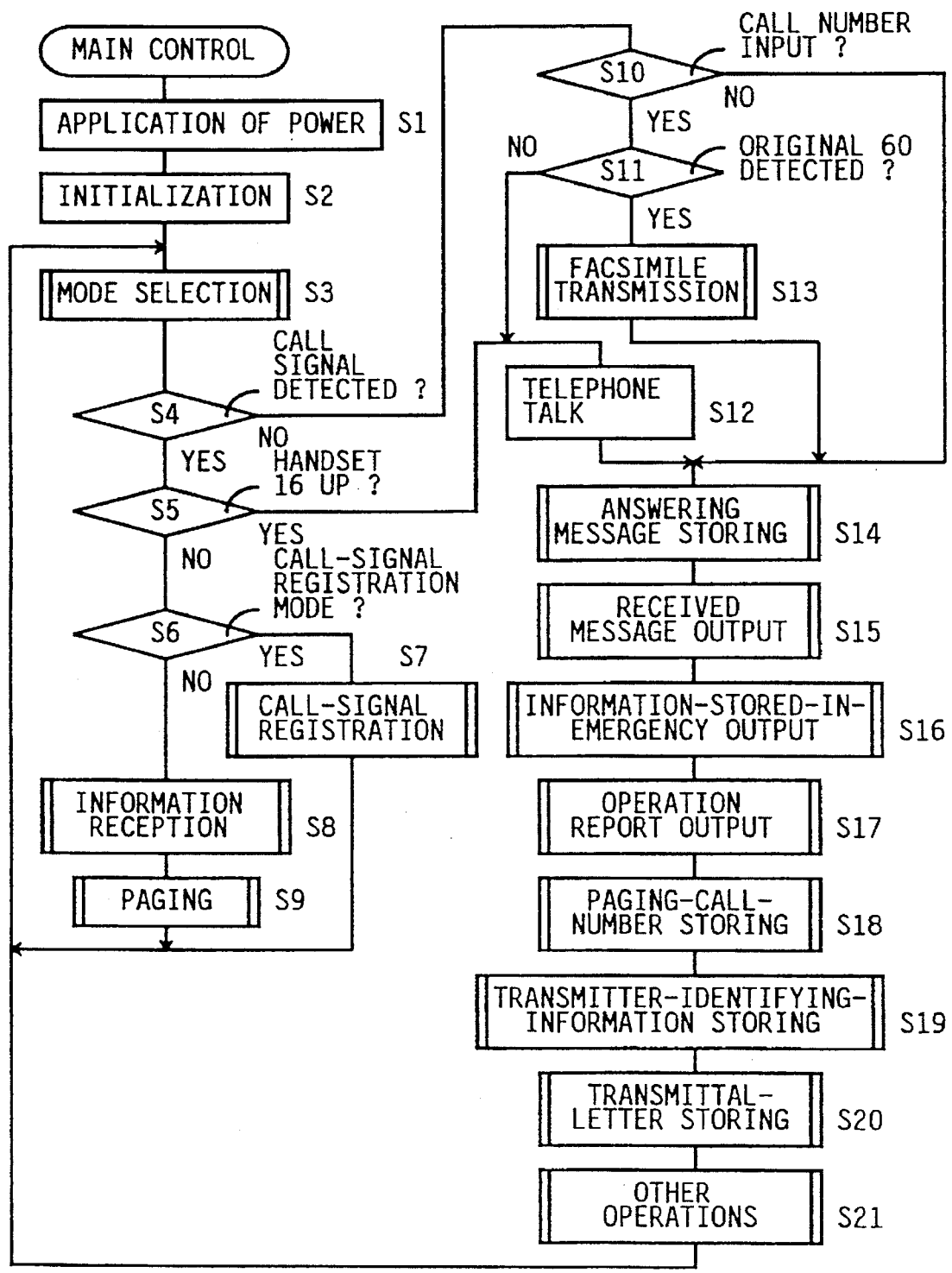
FIG. 12 is a flow chart representing a main control routine according to which the T/F apparatus of FIG. 1 operates.

First, at Step S1 of the main control routine of FIG. 12, an electric power is applied to the T/F apparatus 10 and, at Step S2, initialization is carried out on the apparatus 10. Step S2 is followed by Step S3, i.e., mode selection routine of FIG. 13 in which one or more operation modes are selected on the apparatus 10. The various operation modes selectable on the apparatus 10 are as follows: answering-telephone mode, call-signal registration mode, facsimile automatic reception mode, facsimile manual reception mode, paging-call-number storing mode, answering-message storing mode, received-message output mode, information-stored-in-emergency output mode, operation-report output mode, polling transmission mode, retrieval transmission mode, retrieval-permitting information storing mode, transmitter-identifying information storing mode, and transmittal-letter storing mode.

Subsequently, at Step S4, the CPU 120 of the computer 128 judges whether the NCU 132 has detected an own call signal supplied thereto from the exchange 139 via the telephone line 138. Each call signal takes a high and a low voltage state which are lower than a stationary voltage level of the telephone line 138 with no information being transmitted thereby. Therefore, if the voltage of the signal detected by the NCU 132 from the telephone line 138 is found as being lower than the stationary level, it means that a call signal is being supplied to the T/F apparatus 10 and, if not, no call signal is being received. If a positive judgment is made at Step S4, i.e., if an own call signal has been detected by the NCU 132, the control of the CPU 120 goes to Step S5 to judge whether the handset 16 has been picked up by the user.

If a positive judgment is made at Step S5, that is, if the handset 16 is picked up, then the control of the CPU 120 goes to Step S12. On the other hand, if a negative judgment is made at Step S5, i.e., if the handset 16 remains resting on the lower housing 12, the control goes to Step S6 to judge whether the call-signal registration mode has been selected on the T/F apparatus 10, i.e., whether the apparatus 10 is currently placed in the call-signal registration mode. If a positive judgment is made at Step S6, the control goes to Step S7, i.e., call-signal registration routine of FIGS. 14 and 15 and then returns to Step S3 and the following steps. If a negative judgment is made at Step S6, the control goes to Step S8, i.e., information reception routine and then to Step S9, i.e., paging routine. In the latter case, thereafter, the control of the CPU 120 returns to Step S3 and the following steps.

On the other hand, if a negative judgment is made at Step S4, the control goes to Step S10 to judge whether the user has input a call number into the T/F apparatus 10 through the keyboard 102 which is being monitored according to a keyboard monitor routine (not shown), based on keyboard-monitor information indicating whether or not the individual numeral keys 104 have been pushed by the user. If the user has started pushing appropriate ones of the numeral keys 104 to input a call number into the T/F apparatus 10, the CPU 120 waits for the SET key 108 to be pushed following the keying-in of the last digit of the call number. If a positive judgment is made at Step S10, i.e., if a call number has been input, then the control goes to Step S11 to judge whether any original sheet 60 is set on the original support member 64, based on a detection signal supplied from the original sensor 68. If a positive judgment is made at Step S11, the control goes to Step S13, i.e., facsimile transmission routine of FIG. 25. Step S13 is followed by Step S14. On the other hand, if a negative judgment is made at Step S11, the control goes to Step S12 in which the user of the T/F apparatus 10 can talk with a user of a called telephone set identified by the call number input by the former or first user. Meanwhile, if the handset 16 is put down on the lowering housing 12 and thus the T/F apparatus 10 is disconnected from the telephone line 138, the control of the CPU 120 goes to Step S14. Additionally, if a negative judgment is made at Step S10, i.e., no call number is input, the control directly goes to Step S14.

At Steps S14, S15, S16, S17, S18, S19, S20, and S21, the CPU 120 carries out the answering-message storing routine, received-message output routine, information-stored-in-emergency output routine, operation-report output routine, paging-call-number storing routine, transmitter-identifying-information storing routine, a transmittal-letter storing routine, and other routines, respectively. Thereafter, the control of the CPU 120 goes back to Step S3 and the following steps.

Figure 13:
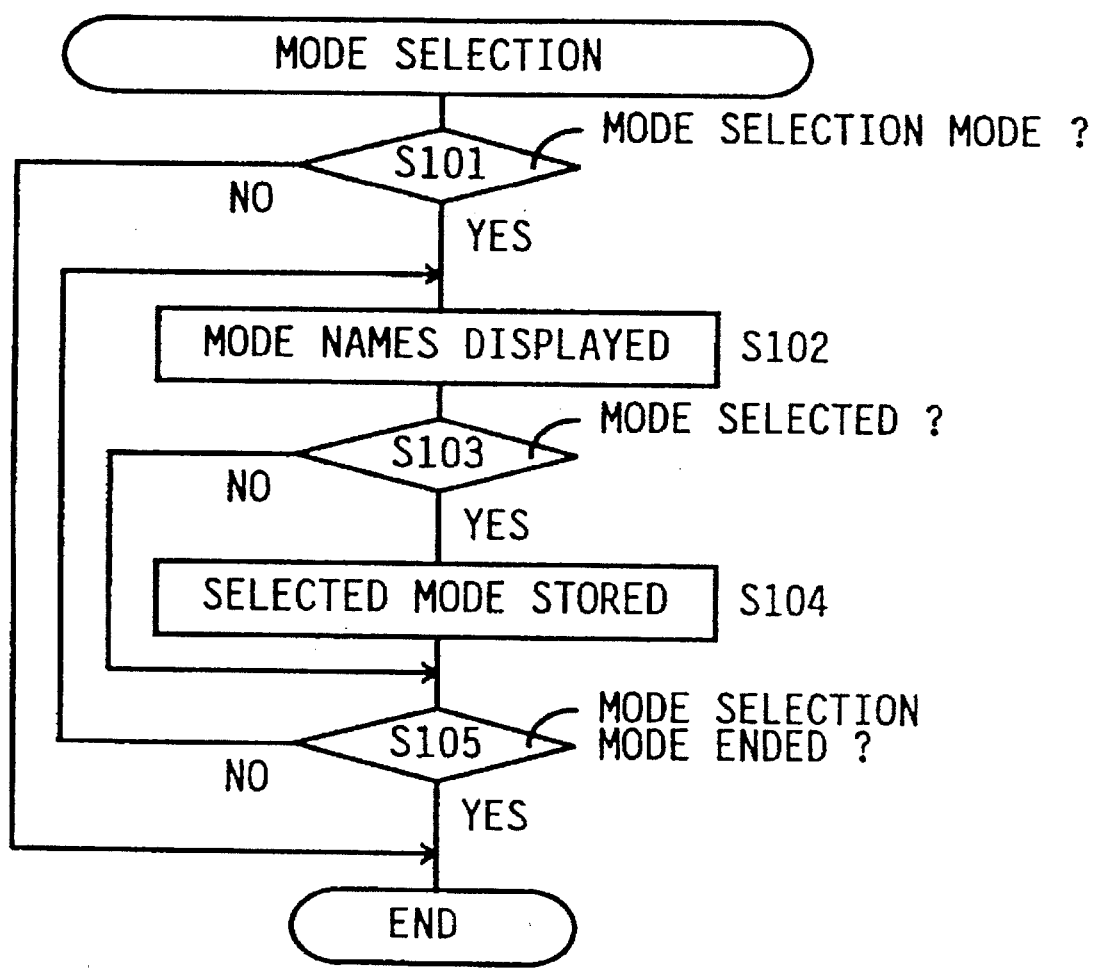
FIG. 13 is a flow chart representing a mode selection routine according to which one or more operation modes is/are selected on the T/F apparatus of FIG. 1.

Next, there will be described the mode selection routine of Step S3 of the main control routine of FIG. 12, by reference to the flow chart of FIG. 13.

First, at Step S101, the CPU 120 judges whether the T/F apparatus 10 is currently placed in the mode selection mode, based on the keyboard-monitor information including data indicating whether the FUNCTION key 106 has been pushed to establish the mode selection mode. If the FUNCTION key 106 is pushed by the user and therefore a positive judgment is made at Step S101, the control of the CPU 120 goes to Step S102 to control the LCD 100 to sequentially display the respective names of the various operation modes selectable on the T/F apparatus 10, each for a predetermined period of time, in a predetermined cyclic order. Step S102 is followed by Step S103 to judge whether one operation mode has been selected. If the keyboard 102 is operated to input a mode-selection command while the name of a certain mode is displayed on the LCD 100 and therefore a positive judgment is made at Step S103, the control goes to Step S104 to select or establish that mode currently displayed on the LCD 100. After a mode has been selected at Step S104, or if no mode-selection command is input at Step S103, the control goes to Step S105 to judge whether the mode selection mode has been ended, based on the information supplied from the keyboard 102. If a negative judgment is made at Step S105, the control returns to Step S102 and the following steps. On the other hand, if a positive judgment is made at Step S105, the current control cycle of this routine is ended. Meanwhile, if a negative judgment is made at Step S101, i.e. if the T/F apparatus 10 is not placed in the mode selection mode, this routine is ended without any further operation.

For example, in the event that the answering-telephone mode is selected on the T/F apparatus 10, first, the FUNCTION key 106 is pushed to select the mode selection mode, so that the respective names of the various operation modes are displayed in the cyclic order on the LCD 100. If a mode-selection key (e.g., cursor key 110 and SET key 108) of the keyboard 102 is pushed while the name of the answering telephone mode is indicated on the LCD 100, the answering telephone mode is selected or established on the T/F apparatus 10. So long as the keyboard 102 is not operated to input an end command, two or more modes may be selected in series in the same manner as described above. The thus selected mode or modes is/are stored in the selected mode memory 142 of the RAM 122. However, it is possible to adapt the T/F apparatus 10 to change, on the LCD 100, the respective names of the various operation modes in response to a change command which is input by the user through the keyboard 102.

Next, there will be described the call-signal registration routine of Step S7 of FIG. 12, by reference to FIGS. 14 and 15.

Figure 33:
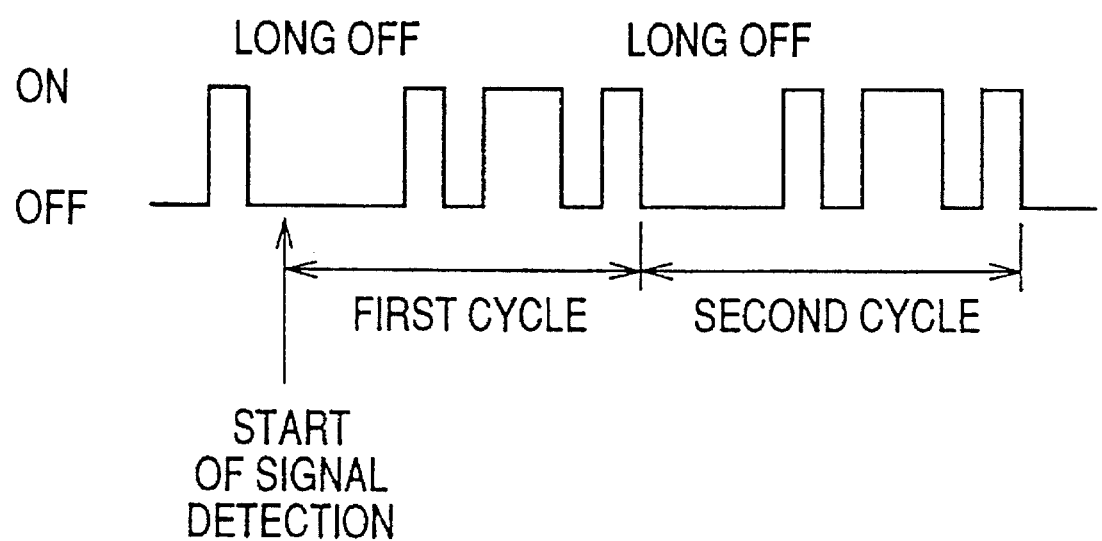
FIG. 33 is a graph showing the ON state, OFF state, and LONG-OFF state of a call signal supplied to the T/F apparatus of FIG. 1 to call the apparatus.

The registration of an own call signal is carried out by first measuring, following detection of a "LONG-OFF" period shown in FIG. 33, the respective times of "ON" and "OFF" periods, then comparing the measured ON and OFF times of a first cycle with the corresponding measured times of a second cycle following the first cycle, and finally storing, in the EEPROM 126, the respective averages of the ON and OFF times of the two cycles if each pair of compared ON or OFF times are essentially identical with each other within a permissible range of measurement errors. Thus, the signal pattern of an own call signal is registered in the T/F apparatus 10.

First, at Step S201, the CPU 120 of the computer 128 judges whether the first flag F1 is set at one, i.e., F1=1. The state of F1=1 indicates that the respective patterns of successively detected two cycles of an own call signal are essentially identical with each other and that the T/F apparatus 10 waits for inputting of a user's command to register the pattern of the own call signal. Upon initialization of the apparatus 10, the first flag F1 had been reset to zero, i.e., F1=0. Therefore, a negative judgment is made at Step S201, and the control of the CPU 120 goes to Step S202 to control the LCD 100 to display a message indicating that the detection of an own call signal has been started.

Step S202 is followed by Step S203 to judge whether the handset 16 has been picked up. When the handset 16 is being picked up, the T/F apparatus 10 is connected to the telephone line 138, so that the T/F apparatus 10 permits the user to talk with a user of a calling telephone set. If a negative judgment is made at Step S203, the control of the CPU 120 goes to Step S204 to judge whether the own call signal being detected is taking a high voltage, i.e., taking an "ON" state.

If a positive judgment is made at Step S204, the control goes to Step S205 to judge whether the second flag F2 is set at one, i.e., F2=1. The state of F2=1 indicates that a LONG-OFF period has been detected. Upon initialization of the T/F apparatus 10, the second flag F2 had been reset to zero, i.e., F2=0. Therefore, a negative judgment is made at Step S205, and the control of the CPU 120 goes to Step S206 to reset a content, C2, of the second counter 168 to zero, i.e., C2=0. Then, the control of the CPU 120 returns to Step S3 of the main control routine of FIG. 12.

So long as an ON state of the own call signal is detected, Steps S201 to S206 are repeated. If the own call signal is taking an ON state when the detection of the call signal is started, or the own call signal takes an ON state following an "OFF" state after the call-signal detection has been started, a negative judgment is made at Step S204, so that the control of the CPU 120 goes to Step S212 to store, in the current signal-state memory 164, data indicating that the own call signal is currently taking an OFF state.

Simultaneously, data which have been stored up to then in the current signal-state memory 164 are transferred to the prior signal-state memory 162. Subsequently, the control of the CPU 120 goes to Step S213 to add one to the content C2 of the second counter 168. Thus, the time measurement of an OFF state or period is started.

Step S213 is followed by Step S214 to judge whether the own call signal was taking an ON state in the preceding control cycle in accordance with the present routine, i.e., call-signal registration routine, based on the data stored in the prior signal-state memory 162. If the own call signal was taking an OFF state upon starting of this routine, a negative judgment is made at Step S214, so that the control of the CPU 120 goes to Step S218 to judge whether a LONG-OFF period has been detected, by comparing the content C2 of the second counter 168 with a reference value or time, $C_A$. If the counter content, i.e., measured time C2 is not smaller than the reference time $C_A$, a positive judgment is made at Step S218. The reference time $C_A$ is shorter than the time of a LONG-OFF period shown in FIG. 33, but is longer than the time of any OFF period other than the LONG-OFF period. Shortly after the starting of a call-signal registration operation, a negative judgment is made at Step S218, so that the control of the CPU 120 goes back to Step S3 of FIG. 12.

If the own call signal was taking an ON state upon starting of this call-signal registration and then changed to an OFF state, a positive judgment is made at Step S214, so that the control of the CPU 120 goes to Step S215 to judge whether the second flag F2 is set at F2=1. At this stage, however, a LONG-OFF period has not been detected, and therefore a negative judgment is made at Step S215. Then, the control goes back to Step S3 of FIG. 12.

So long as an OFF state of the own call signal is detected, Steps S201 to S204, S212, and S213 are repeated and a negative judgment is repetitively made at Step S214, so that at Step S218 the content C2 of the second counter 168 is successively incremented. Unless this OFF state is a LONG-OFF period, the own call signal will change to an ON state before the negative judgments made at Step S218 change to a positive one. In that case, a positive judgment is made at Step S204, and at Step S205 a negative judgment is made because a LONG-OFF period has not been detected yet. Then, the control of the CPU 120 goes to Step S206 to reset or clear the content C2 of the second counter 168 representing the measured time of the current OFF state or period. Thus, the measured time of this OFF period is discarded.

Steps S201 to S206, S212 to S214, and S218 are repeated until a LONG-OFF period is detected. Meanwhile, if an OFF state of the own call signal which continues for a time not less than the reference time $C_A$ is detected, a positive judgment is made at Step S218, so that the control of the CPU 120 goes to Step S219 to judge whether the third flag F3 is set at one, i.e., F3=1. The third flag F3 is referred to in judging whether to increment a content, C3, of the third counter 170 upon detection of a LONG-OFF period. Upon initialization of the T/F apparatus 10, the third flag F3 has been reset to zero, i.e., F3=0. At this stage, therefore, a negative judgment is made at Step S219, so that the control of the CPU 120 goes to Step S220 to set the third flag F3 to F3=1 and then goes to Step S221 to set the second flag F2 to F3=1, thereby indicating that a LONG-OFF period has been detected, and add one to the content C3 of the third counter 170, thereby counting the number of detected LONG-OFF periods.

Figure 14:
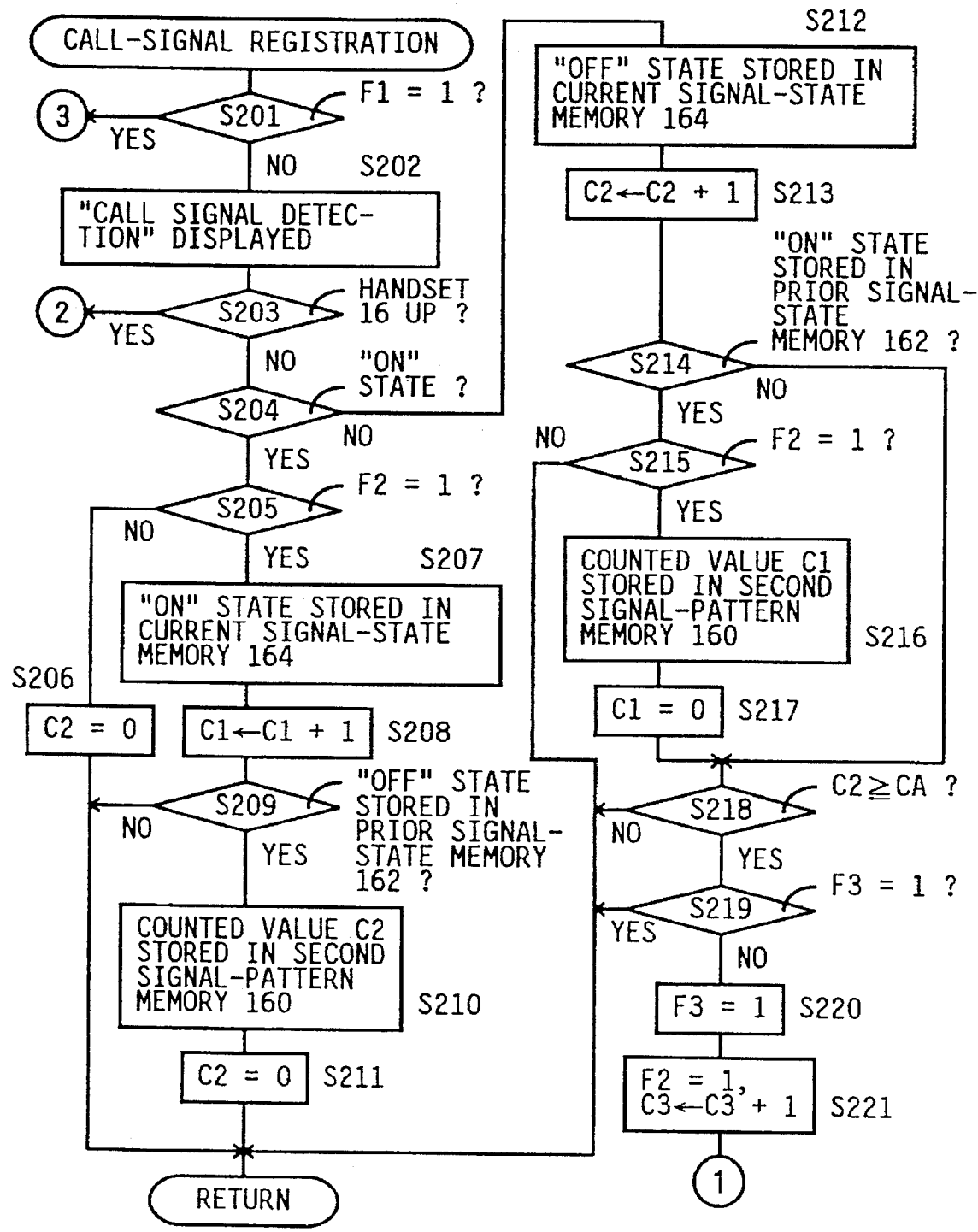
FIG. 14 is a flow chart representing a first half of a call-signal registration routine according to which one or more call signals is/are registered on the T/F apparatus of FIG. 1.
Figure 15:
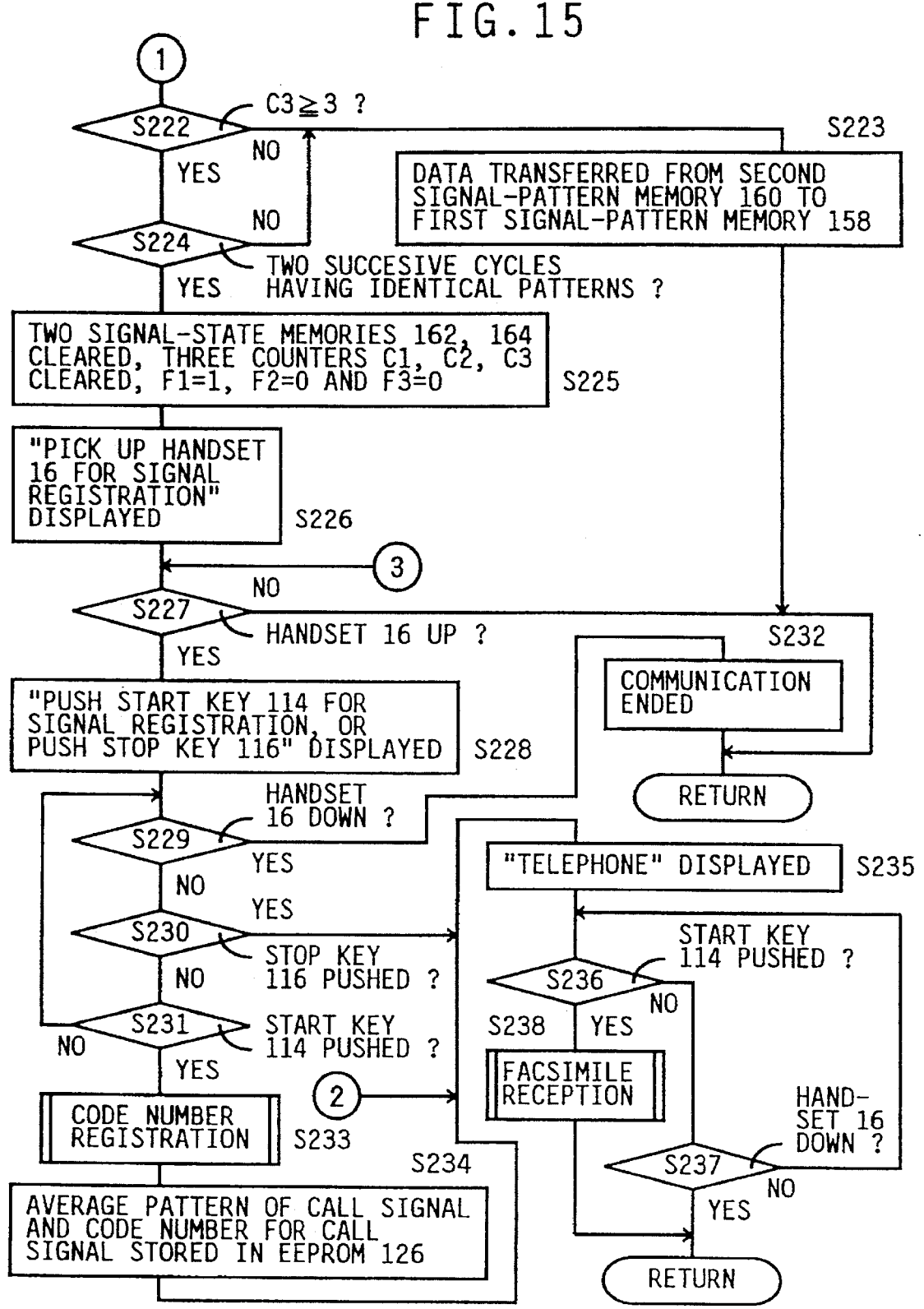
FIG. 15 is a flow chart representing a second half of the call-signal registration routine of FIG. 14.

Step S221 of FIG. 14 is followed by Step S222 of FIG. 15 where the CPU 120 judges whether the content C3 of the third counter 170 is not less than three, i.e., whether the respective patterns of two cycles of an own call signal have been detected. At this stage, a negative judgment is made at Step S222, so that the control of the CPU 120 goes to Step S223 to transfer data stored in the second signal-pattern memory 160 into the first signal-pattern memory 158. Since, however, the data of the first and second signal-pattern memories 158, 160 had been cleared upon initialization of the T/F apparatus 10, no data is stored in the second memory 160 at the time when a LONG-OFF period is first detected. In the current control cycle, therefore, no data is transferred from the second memory 160 to the first memory 158. Then, the control of the CPU 120 goes back to Step S3 of the main control routine of FIG. 12.

Since the time of a LONG-OFF period is longer than the reference time $C_A$, Steps S201 to S204, S212 to S214, S218, and S219 are repeated even after the negative judgments made at Step S218 have changed to a positive one, until the own call signal takes an ON state following the LONG-OFF period.

If the own call signal changes from a LONG-OFF period to an ON state, a positive judgment is made at Step S205 because the second flag F2 has been set to F2=1, so that the control of the CPU 120 goes to Step S207 to store, in the current signal-state memory 164, data indicating that the own call signal is currently taking an ON state, and then goes to Step S208 to add one to a content, C1, of the first counter 166 to start measuring the time of the ON state or period. Step S208 is followed by Step S209 to judge whether the own call signal was taking an OFF state (this OFF state may be a LONG-OFF period or a shorter OFF period) before the current ON state. If the own call signal has changed from an OFF state to an ON state, a positive judgement is made at Step S209, so that the control of the CPU 120 goes to Step S210 to store the content C2 of the second counter 168 in a first memory area of the second signal-pattern memory 160 and reset the third flag F3 to F3=0, and then goes to Step S211 to clear the content C2 of the second counter 168 to zero.

So long as the own call signal being detected continues to take an ON state, Steps S201 to S205, and S207 to S209 are repeated, so that the first counter 166 measures the time of the ON state or period. Meanwhile, if the own call signal changes from the ON state to an OFF state, the positive judgments made at Step S204 change to a negative one, so that the CPU 120 carries out Steps S212 to S215. Since a LONG-OFF period has been detected, a positive judgment is made at Step S215, so that the control goes to Step S216 to store the content C1 of the first counter 166, i.e., the measured time of the ON period, in a second memory area of the second signal-pattern memory 160, and then goes to Step S217 to clear the content C1 of the first counter 166.

Since this OFF state is not a LONG-OFF period, this OFF state or period changes to an ON state before a positive judgment is made at Step S218. Therefore, a positive judgment is made at Step S204, and the measured time of the OFF period is stored in a third memory area of the second signal-pattern memory 160. Thus, the time or times of ON period or periods and the time or times of OFF period or periods, each contained in the pattern of an own call signal, are measured and stored. If a second LONG-OFF period is detected, a positive judgment is made at Step S218. At that time, the third flag F3 has been reset to F3=0, and therefore a negative judgment is made at Step S219, so that at Step S221 one is added to the content C3 of the third counter 170. Thus, the number of detected LONG-OFF periods is counted. Step S221 is followed by Step S222. In this case, a negative judgment is made, so that the control of the CPU 120 goes to Step S223 to transfer the data stored in the second signal-pattern memory 160, i.e., the measured times of the ON and OFF periods of the first cycle, into the first signal-pattern memory 158.

Then, the respective times of ON and OFF periods of the second cycle following the first cycle are measured in the same manner as described above for the first cycle, and stored in the second signal-pattern memory 160. If a third LONG-OFF period is detected, a positive judgment is made at Step S222, so that the control of the CPU 120 goes to Step S224 to judge whether the measured times of the ON and OFF periods of the first cycle are essentially identical with the corresponding ON and OFF times of the second cycle. That is, the respective times of ON and OFF periods of the first cycle stored in the first signal-pattern memory 158 are compared with the respective times of ON and OFF periods of the second cycle stored in the second signal-pattern memory 160. If the respective times of the first cycle are essentially identical with the corresponding times of the second cycle within a permissible range of measurement errors, a positive judgment is made at Step S224.

If a negative judgment is made at Step S224, the control of the CPU 120 goes to Step S223 to transfer the data stored in the second signal-pattern memory 160 to the first signal-pattern memory 158. For example, in the event that the NCU 132 had started measuring the time of a LONG-OFF period from an intermediate point thereof as shown in FIG. 33 and the measured time is longer than the reference time $C_A$, the measured OFF period is identified or counted as a LONG-OFF period and the measured time is stored as the time of a LONG-OFF period. Since, however, the stored time of the LONG-OFF period is shorter than the correct time of a LONG-OFF period, a negative judgment is made at Step S224. In this case, the respective times of ON and OFF periods of a third cycle following the second cycle are measured and stored in the second signal-pattern memory 160. In this way, the ON- and OFF-period measurements of an own call signal are continued until a positive judgment is made at Step S224.

If the respective times of ON and OFF periods of a first cycle are essentially identical with the corresponding times of a second cycle following the first cycle, that is, if a positive judgment is made at Step S224, then the control of the CPU 120 goes to Step S225 to clear the respective contents of the first to third counters 166 to 170, each to zero, reset the second and third flags F2, F3 to F2=0 and F3=0, respectively, clear the first and second signal-pattern memories 158, 160, each to zero, clear the prior and current signal-state memories 162, 164, each to zero, and set the first flag F1 to F1=1, thereby indicating that the respective patterns of two successive cycles of an own call signal are essentially identical with each other.

Step S225 is followed by Step S226 to control the LCD 100 to display a message indicating that if the user wishes to register the detected own call signal, the user is requested to pick up the handset 16. At the following Step S227, the CPU 120 judges whether the handset 16 has been picked up. If a negative judgment is made at Step S227, the control goes back to Step S3 of FIG. 12. Steps S3–S6, S201, and S227 are repeated until the handset 16 is picked up.

If a positive judgment is made at Step S227, the control of the CPU 120 goes to Step S228 to control the LCD 100 to display a message indicating that if the user pushes the START key 114 the detected own call signal is registered and if the user pushes the STOP key 116 the detected own call signal is not registered. Step S228 is followed by Step S229 to judge whether the handset 16 has been put down on the lower housing 12. If a positive judgment is made at Step S229, the control goes to Step S232 to disconnect the T/F apparatus 10 from the telephone line 138 and end this communication, and then goes back to Step S3 of FIG. 12. On the other hand, if a negative judgment is made at Step S229, the control goes to Step S230 to judge whether the STOP key 116 has been pushed. If a negative judgment is made at Step S230, the control goes to Step S231 to judge whether the START key 114 has been pushed.

Steps S229 to S231 are repeated until the detection of one of (a) the putting-down of the handset 16, (b) the pushing of the STOP key 116, and (c) the pushing of the START key 114. If the handset 16 is put down, Step S232 is carried out in the manner as described above.

On the other hand, if the user does not wish to register the detected own call signal and pushes the STOP key 116, the control of the CPU 120 goes to Step S235 to command the LCD 100 to display a message of "TELEPHONE" indicating that the telephone line 138 is alive. In this case, the user of the telephone set of the T/F apparatus 10 can talk with the user of the calling telephone set via the telephone line 138, or otherwise the facsimile machine of the apparatus 10 can receive image information from a calling facsimile machine. Step S235 is followed by Step S236 to judge whether the START key 114 has been pushed to input a user's command to receive the facsimile information. If a negative judgment is made at Step S236, the control of the CPU 120 goes to Step S237 to judge whether the handset 16 has been put down to input a user's command to end this communication. On the other hand, if a negative judgment is made at Step S236, the control goes to Step S238 that is the same as Step S703 described later.

In the case where the T/F apparatus 10 is placed in the call-signal registration mode, the apparatus 10 is automatically placed in the facsimile manual information reception mode, irrespective of whichever mode or modes has or have been selected from various facsimile automatic information reception modes of the apparatus 10. Therefore, if the user of the apparatus 10 can hear the voices of the user of the calling telephone set through the handset 16 being picked up, the former user can talk with the latter user. Meanwhile, if not, the former user can judge that the facsimile machine of the apparatus 10 is being called, so that the user pushes the START key 114 to receive the facsimile information transmitted-from the calling facsimile machine.

If the START key 114 is pushed and a positive judgment is made at Step S231, the control of the CPU 120 goes to Step S233, i.e., code-number registration routine where a code number for the own call signal being registered is stored in the input code-number memory 152 as described later. Step S233 is followed by Step S234 to calculate the average of (a) each of the ON and OFF times of the first cycle stored in the first signal-pattern memory 158 and (b) a corresponding one of the ON and OFF times of the second cycle stored in the second signal-pattern memory 160, and store the calculated averages as pattern data representing the signal pattern of the own call signal, in the registered-code-number table memory 230 of the EEPROM 126. Additionally, the CPU 120 reads the code number stored in the input code-number memory 152 at Step S233, and stores data representing the code number, in relation with the pattern data representing the signal pattern of the own call signal, in the registered-code-number table memory 230. Thereafter, the input code-number memory 152 is initialized or cleared. Thus, at Step S234, the signal pattern of an own call signal is registered in the form of pattern data including the respective counted values of the ON and OFF periods each of which is measured beginning at the time of transition from an ON state to an OFF state or the time of transition from an OFF state to an ON state, and the registered own call signal is related with the code number selected and input by the user. In the present embodiment, two or more call signals can be registered for the telephone set or function of the T/F apparatus 10, and two or more call signals can be registered for the facsimile machine or function of the apparatus 10. Each of the own call signals include three ON periods, and three OFF periods one of which is a LONG-OFF period, as shown in FIG. 33. Step S234 is followed by Step S235 and the following steps. Thus, this routine is ended, and the control of the CPU 120 goes back to Step S3 of the main control routine of FIG. 12.

Figure 16:
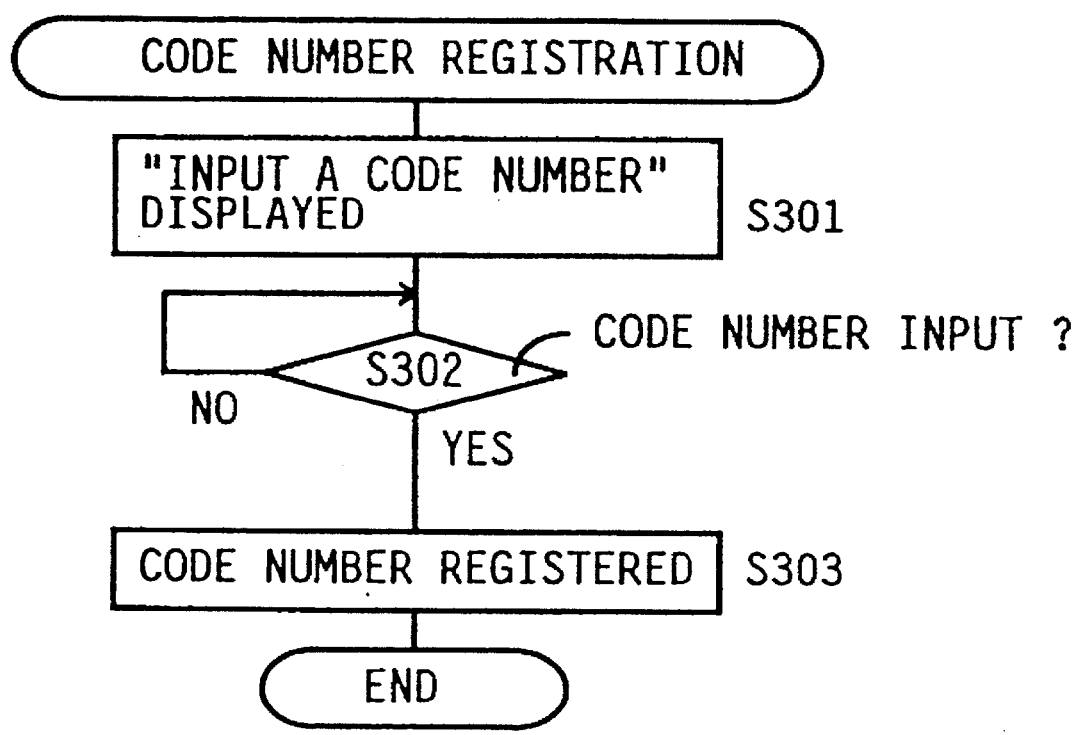
FIG. 16 is a flow chart representing a code-number registration routine according to which one or more code numbers is/are registered on the T/F apparatus of FIG. 1.

Next, the code-number registration routine of Step S233 of FIG. 15 will be described by reference to the flow chart of FIG. 16.

At Step S301, the CPU 120 controls the LCD 100 to display a message of "INPUT A CODE NUMBER". Step S301 is followed by Step S302 to judge whether a code number has been input in relation with the signal pattern of an own call signal being registered. The user can select and input, as a code number to be registered, an arbitrary number such as a one-digit number or a number identical with an own call number corresponding to the own call signal being registered. However, the user cannot use, as a code number, a number identical with a pre-scribed special number which is allotted to the non-registered-code-number related memory 144b. This special number can be used as a common number corresponding to one or more own call signals which have not been registered. In the present embodiment, this special number is handled as if it were a registered code number.

Step S301 is followed by Step S302 to judge whether one or more of the numeral keys 104 has or have been pushed to input a code number and thereafter the SET key 108 has been pushed to finally fix the inputting of the code number. If a positive judgment is made at Step S302, the control of the CPU 120 goes to Step S303 to store, in the input code-number memory 152, the code number thus input by the user.

Figure 17:
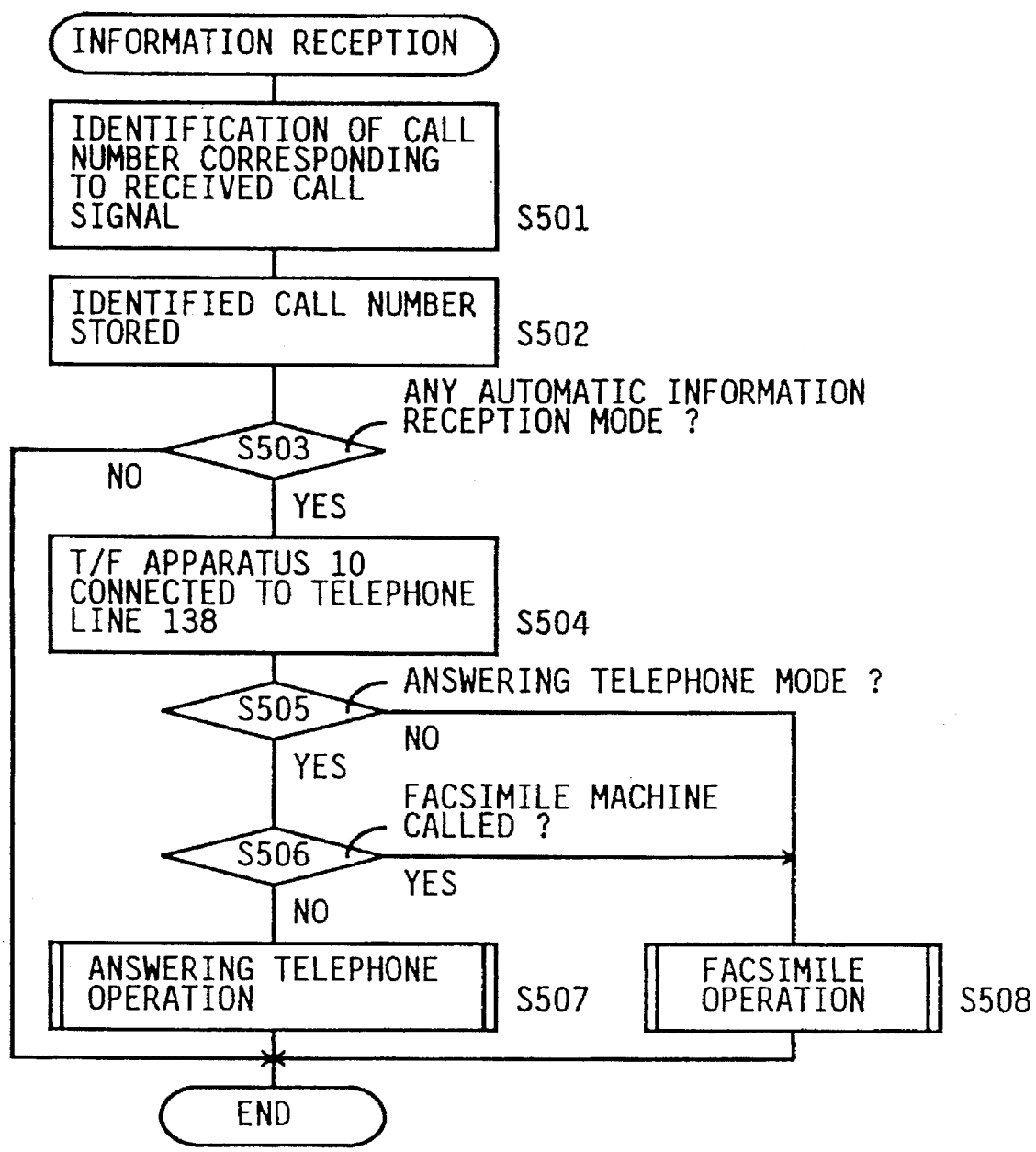
FIG. 17 is a flow chart representing an information reception routine according to which information is received by the T/F apparatus of FIG. 1.

Next, there will be described the information reception routine of Step S8 of the main control routine of FIG. 12, by reference to the flow chart of FIG. 17.

Initially, at Step S501, the CPU 120 of the computer 128 obtains the signal pattern of an own call signal which is received by the T/F apparatus 10 via the telephone line 138, in a manner similar to that described for the call-signal registration routine of Step S7 by reference to FIGS. 14 and 15. In this routine, however, the CPU 120 obtains, as the signal pattern or pattern data, the respective times of ON and OFF periods of one cycle of the own call signal unlike the call-signal registration routine wherein the respective patterns of two cycles of an own call signal are obtained. The thus obtained pattern of the received own call signal is compared with each of the respective patterns of the own call signals registered in the registered-code-number table memory 230, so that one of the registered code numbers which corresponds to the pattern of the received own call signal is identified. Hereinafter, this operation will be referred to as the identification of a call number.

If the pattern of the received own call signal is not identical with any of the signal patterns registered in the table memory 230, that is, if the T/F apparatus 10 is receiving an own call signal corresponding to one of the non-registered own call numbers thereof, the CPU 120 produces data indicating that the received own call signal has no corresponding registered code number.

Step S501 is followed by Step S502 to store the registered code number identified based on the received call signal at Step S501, in the identified code-number memory 140. If the received own call signal is a non-registered one, the CPU 120 stores the special number pre-allotted to the non-registered-code-number related memory 144b, in the identified code-number memory 140.

At the following Step S503, the CPU 120 refers to the selected mode memory 142 and judges whether one or more of various facsimile or telephone automatic information reception modes has or have been established on the T/F apparatus 10. The various facsimile automatic information reception modes and the answering telephone mode are the automatic information reception modes. Therefore, if one or more of the facsimile automatic information reception modes and the answering telephone mode has or have been established, a positive judgment is made at Step S503, so that the control of the CPU 120 goes to Step S504 to connect the T/F apparatus 10 to the telephone line 138. On the other hand, if none of the automatic information reception modes has been selected, a negative judgment is made at Step S503 and the current control cycle of this routine is ended.

Step S504 is followed by Step S505 to judge whether the answering telephone mode has been established. If a positive judgment is made at Step S505, the control of the CPU 120 goes to Step S506 to judge whether the received own call signal is calling the facsimile machine of the T/F apparatus 10, or calling the telephone set of the apparatus 10. If the facsimile machine is being called in the answering telephone mode and a positive judgment is made at Step S506, the control of the CPU 120 proceeds with Step S508, i.e., facsimile operation routine. On the other hand, if a negative judgment is made at Step S506, i.e., if the telephone set is being called, the control goes to Step S507, i.e., answering telephone routine. Following Step S508 or S507, the current control cycle of this routine is ended. If a negative judgment is made at Step S505, i.e. if the answering telephone mode has not been selected, the control goes to Step S508 to carry out the facsimile operation routine. In this case, too, the control cycle of this routine is ended.

Figure 18:
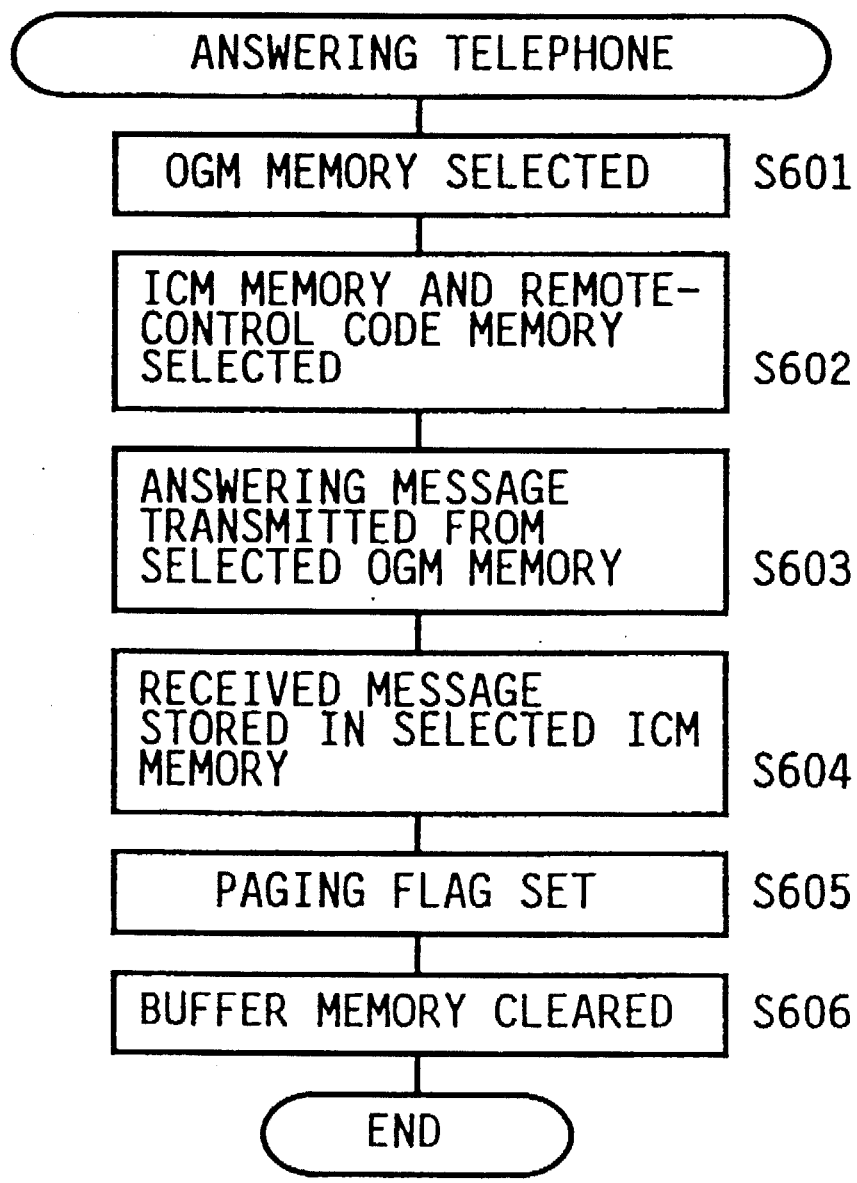
FIG. 18 is a flow chart representing an answering telephone routine according to which the T/F apparatus of FIG. 1 operates as an answering telephone set.

The answering telephone routine of Step S507 of FIG. 17 will be described by reference to the flow chart of FIG. 18.

At Step S601, the CPU 120 selects one of the answering message memories 172 which corresponds to the code number stored in the identified code-number memory 140, and stores the address of the selected memory 172 in a buffer memory (not shown) thereof. Step S602 is followed by Step S602 to selects one of the received message memories 174, and one of the remote-control code memories 180, each of which corresponds to the identified code number stored in the memory 140, and stores the respective addresses of the selected memories 174, 180 in the buffer memory.

At the following Step S803, the CPU 120 refers to the buffer memory, and reads an answering message (indicated at "OGM" in FIG. 18) from the selected answering message memory 172 corresponding to the identified code number. The CPU 120 additionally transmits the answering message to the calling telephone. While transmitting the answering message, the CPU 120 periodically judges whether a DTMF signal is being supplied to the T/F apparatus 10 from the calling telephone set. If the DTMF signal is received, the CPU 120 compares the received DTMF signal with a remote-control code stored in the selected remote-control code memory 180 corresponding to the identified code number. In the case where no DTMF signal is supplied or the received DTMF is different from the stored remote-control code, the T/F apparatus 10 continues to transmit the answering message. If the transmission of the answering message has been completed, the control of the CPU 120 goes to Step S604.

At Step S604, the CPU 120 refers to the buffer memory, and selects one of the received message memories 174 which corresponds to the identified code number. The CPU 120 stores a received message transmitted from the calling telephone set, in the selected memory 174. Step S604 is followed by Step S605 to set one of the paging flags 178 which corresponds to the identified code number, to an ON state thereof. At the following Step S606, the CPU 120 clears the buffer memory, and thus the current control cycle of this routine is ended.

Figure 19:
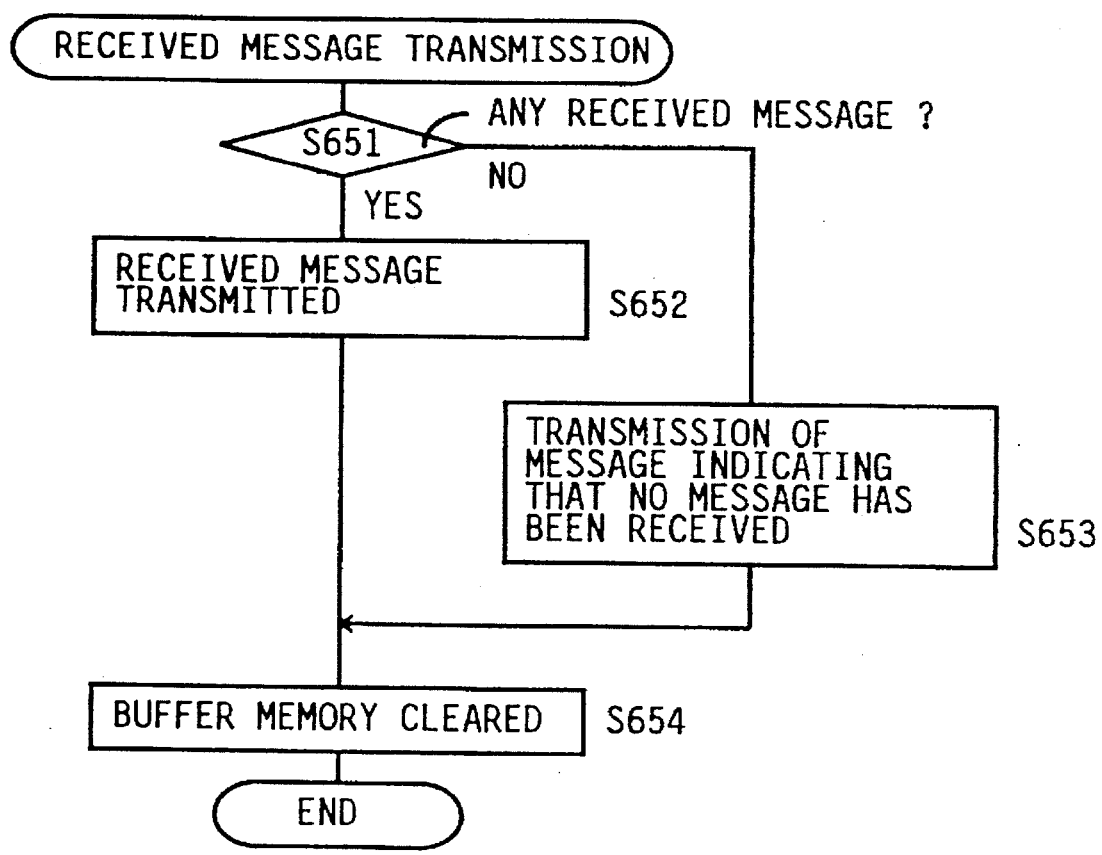
FIG. 19 is a flow chart representing a received-message transmission routine according to which a received message is transmitted by the T/F apparatus of FIG. 1.

On the other hand, if a DTMF signal is received by the T/F apparatus 10 while Step S603 is being carried out and the received DTMF signal is found to be identical with the remote-control code stored in the remote-control code memory 180 corresponding to the identified code number, the transmission of the answering message is interrupted, and the control of the CPU 120 proceeds with the received message transmission routine of FIG. 19.

First, at Step S651, the CPU 120 refers to the buffer memory which has stored the address of the received message memory 174 corresponding to the identified code number, and judges whether a received message or messages has or have been stored in the addressed memory 174. If a positive judgment is made at Step S651, the control goes to Step S652 to read the message or messages from the memory 174 and transmit the sound information to the calling telephone set. If a negative judgment is made at Step S651, the control goes to Step S653 to transmit a sound message indicating that no message has been received or stored. Step S652 or S653 is followed by Step S64 to clear the buffer memory of the RAM 122. Thus, the control cycle of this routine is finished.

Figure 20:
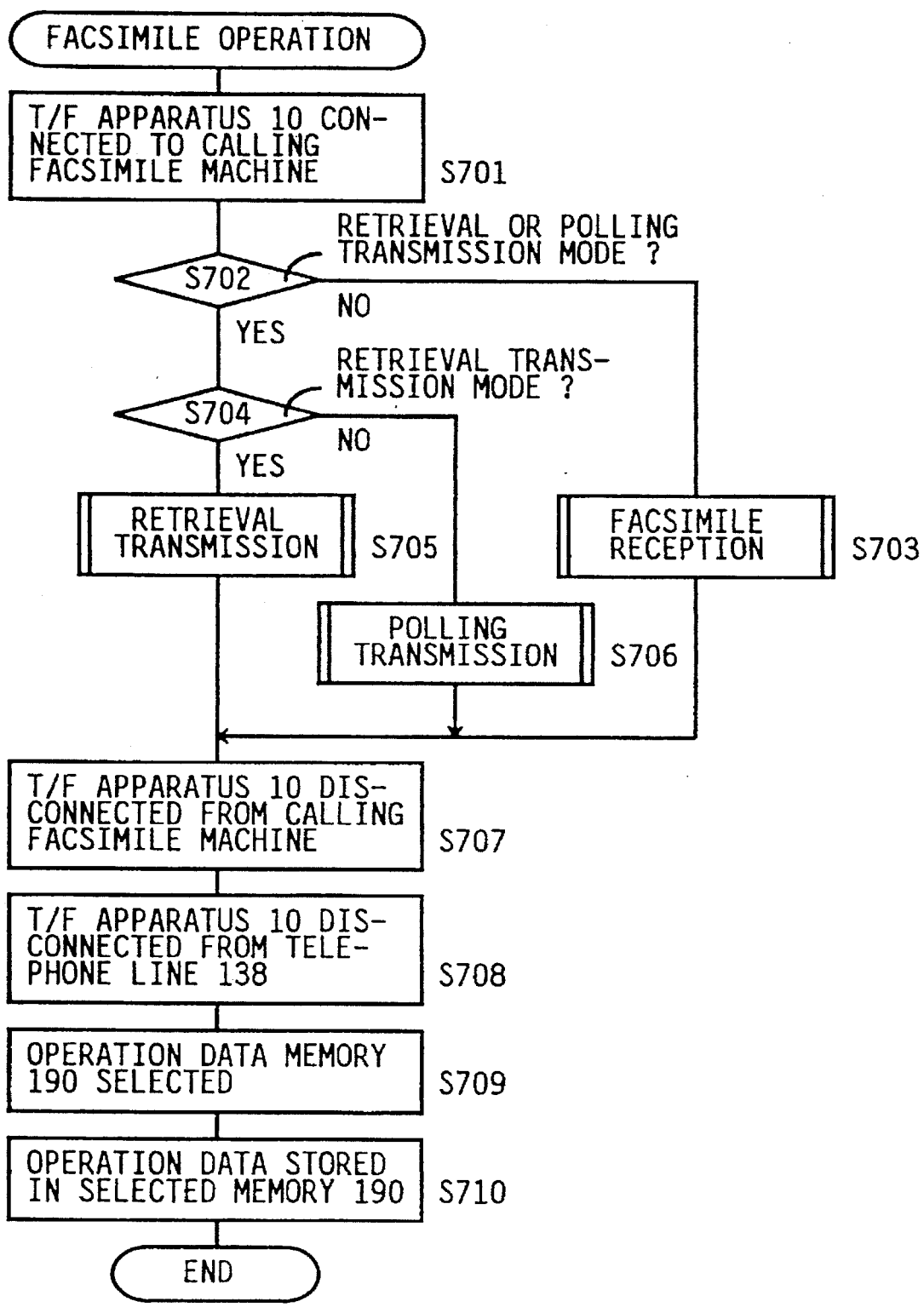
FIG. 20 is a flow chart representing a facsimile operation routine according to which the T/F apparatus of FIG. 1 operates as a facsimile machine.

Next, there will be described the facsimile operation routine of step S508 of FIG. 17, by reference to the flow chart of FIG. 20.

At Step S701, the CPU 120 of the computer 128 connects the facsimile machine of the T/F apparatus 10 to the calling facsimile machine, according to a known facsimile-to-facsimile communication procedure. Step S701 is followed by Step S702 to refer to the selected mode memory 142 and judge whether one or both of the retrieval transmission mode and the polling transmission mode has or have been selected. If a positive judgment is made at Step S702, the control goes to Step S704 to judge whether the retrieval transmission mode has been selected. If a negative judgment is made at Step S702, the control goes to Step S703, i.e., facsimile reception routine of FIG. 21. Step S703 is followed by Step S707.

Figure 22:
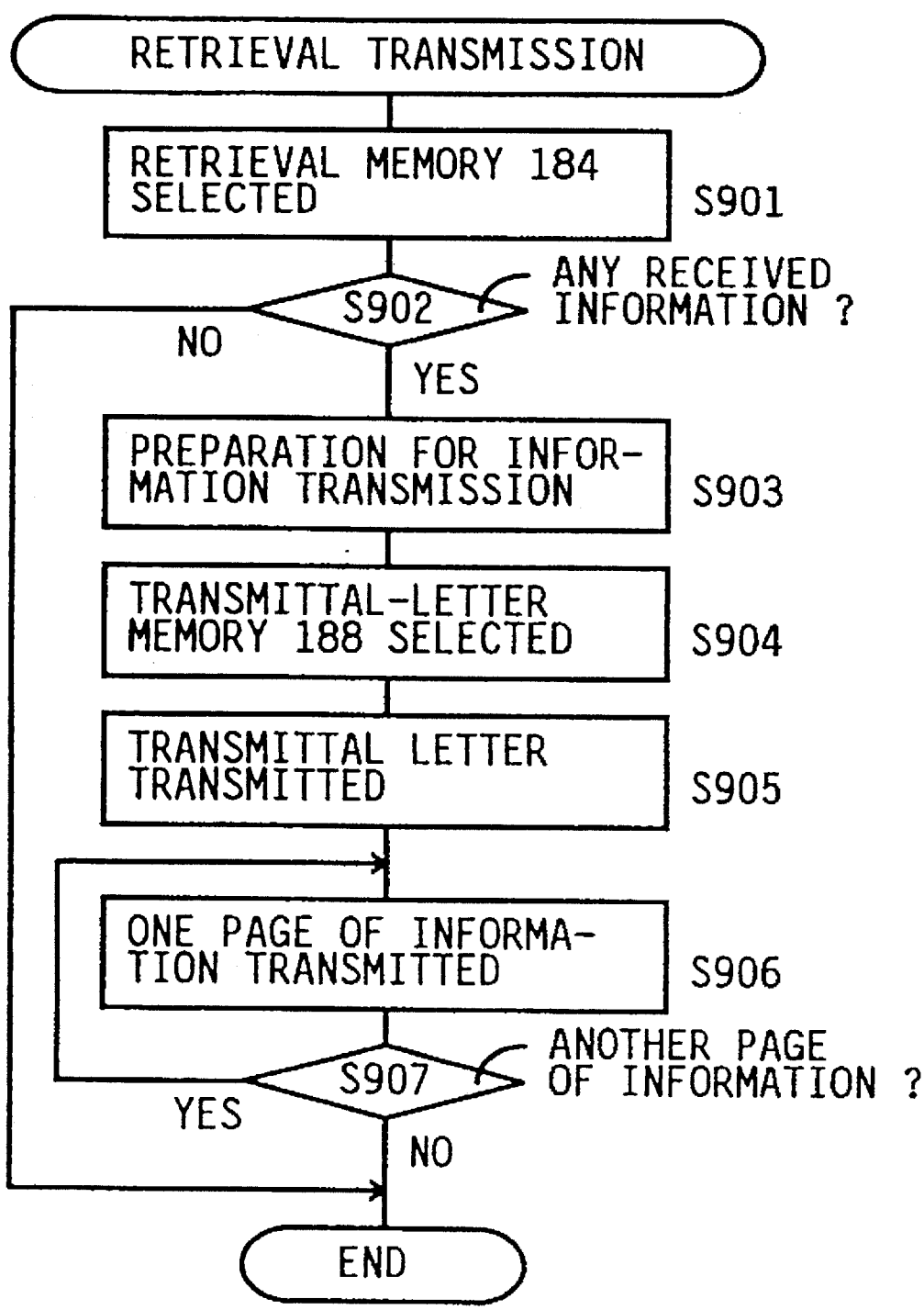
FIG. 22 is a flow chart representing a retrieval transmission routine according to which retrieval transmission is carried out by the T/F apparatus of FIG. 1.

If a positive judgment is made at Step S704, the control goes to Step S705, i.e., retrieval transmission routine of FIG. 22. Step S705 is followed by Step S707. On the other hand, if a negative judgment is made at Step S704, the control goes to Step S706, i.e., polling transmission routine of FIG. 23. Step S706 is followed by Step S707. At Step S707, the CPU 120 disconnects the T/F apparatus 10 from the calling facsimile machine and, at Step S708, the CPU 120 disconnects the T/F apparatus 10 from the telephone line 138.

At the following Step S709, the CPU 120 selects one of the operation-data memories 190 which corresponds to the code number identified based on the own call signal supplied to the T/F apparatus 10. Step S709 is followed by Step S710 to store operation data relating to the information reception or transmission of the facsimile machine of the apparatus 10. Thus, the control cycle of this routine is ended.

Figure 21:
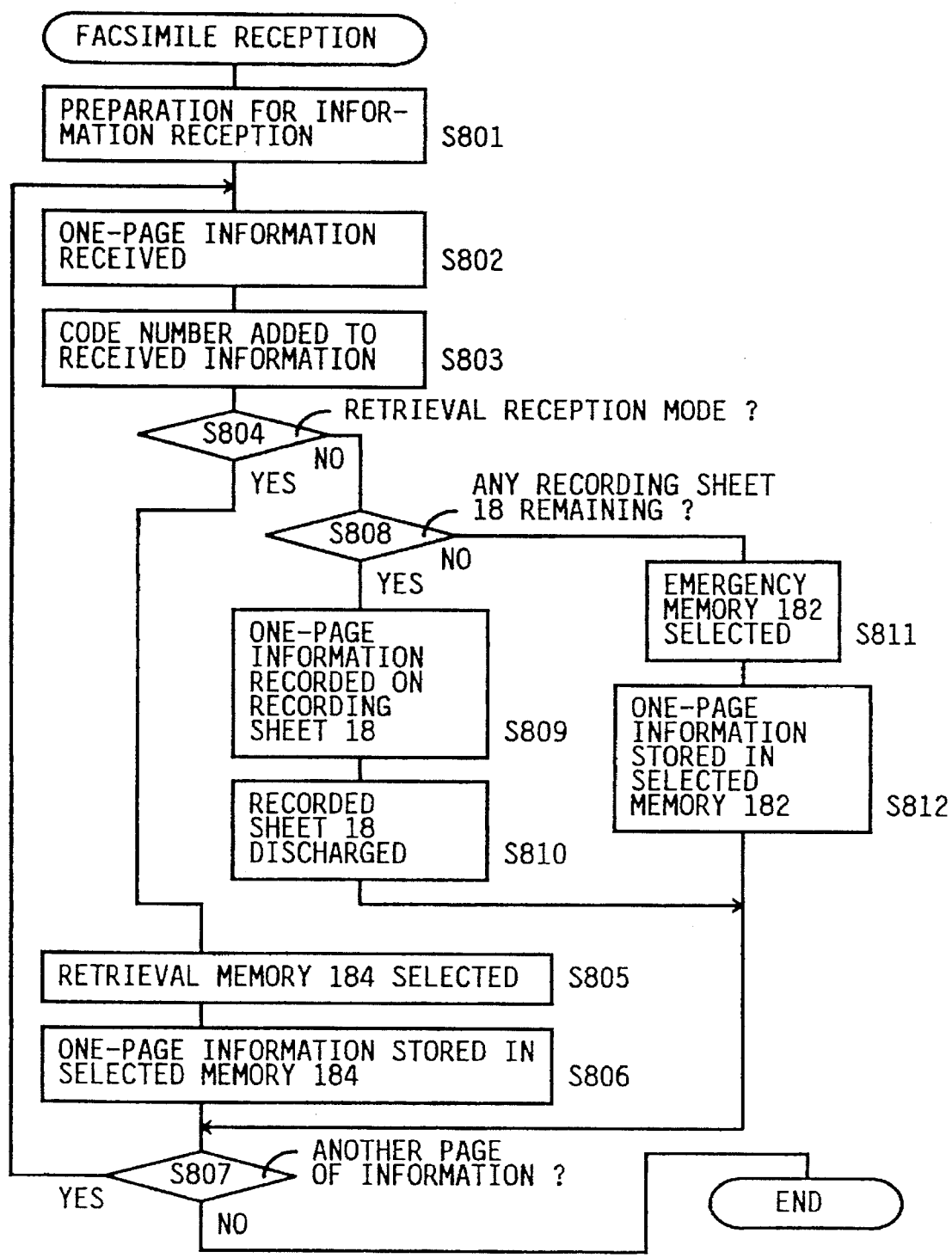
FIG. 21 is a flow chart representing a facsimile reception routine according to which image information is received by the T/F apparatus of FIG. 1.

Next, there will be described the facsimile reception routine of Step S703 of FIG. 20, by reference to the flow chart of FIG. 21.

At Step S801, the CPU 120 prepares for receiving information from the calling facsimile machine, according to a known facsimile information reception procedure. Step S801 is followed by Step S802 to store, in the reception memory 150, the received, coded image information corresponding to one page, i.e., one recording sheet 18. At the following Step S803, the CPU 120 adds image information representing the identified code number, to the image information stored in the reception memory 150. Since the received information is the coded information, the code-number information is coded in a coding method compatible with the received information. Step S803 is followed by Step S804 to judge whether the retrieval-permitting information storing mode ("retrieval" mode) has been selected. If a positive judgment is made at Step S804, the control goes to Step S805 and, on the other hand, if a negative judgement is made the control goes to Step S808. At Step S805, the CPU 120 selects one of the retrieval memories 184 which corresponds to the identified code number, and at Step S806 the CPU 120 stores the one-page coded information and the coded code-number information in the selected memory 184.

Meanwhile, at Step S808, the CPU 120 judges whether any recording sheet 18 remains in the sheet cassette 20, i.e., whether images can be recorded on a recording sheet 18. If a positive judgment is made at Step S808, the control goes to Step S809 to record the one-page image information on the recording sheet 18 and subsequently to Step S810 to discharge the image-recorded sheet 18 out of the T/F apparatus 10. At Step S808, a negative judgment is made, e.g., if the first sheet-end sensor 32 does not detect the leading end of a recording sheet 18 for a predetermined time duration, e.g., 10 seconds, after the CPU 120 commands the sheet-supplying roller 22 to take a recording sheet 18 from the sheet cassette 20.

On the other hand, if a negative judgment is made at Step S808, i.e., if no recording sheet 18 remains in the sheet cassette 20, the control goes to Step S811 to select one of the emergency memories 182 which corresponds to the identified code number, and then to Step S812 to store the one-page coded information and the coded code-number information in the selected memory 182.

Step S806, S810, or S812 is followed by Step S807 to judge whether the T/F apparatus has received another page of information. If a positive judgment is made at Step S807, the control of the CPU 120 goes back to Step S802 and the following steps and, on the other hand, if a negative judgment is made the control cycle of this routine is ended.

The retrieval transmission routine of Step S705 of FIG. 20 will be described by reference to the flow chart of FIG. 22.

At Step S901, the CPU 120 selects one of the retrieval-permitting information storing ("retrieval") memories 184 which corresponds to the identified code number stored in the identified code-number memory 140. At the following Step S902, the CPU 120 judges whether any received information has been stored in the selected memory 184. If no information has been stored, i.e., if a negative judgment is made at Step S902, then the current control cycle of this routine is ended. On the other hand, if a positive judgment is made at Step S902, the control of the CPU 120 goes to Step S903 to prepare for transmitting image information according to a known facsimile information transmission procedure. The CPU 120 operates for converting the received information stored in the selected memory 184 by the coding method determined in the information transmission procedure, and storing the converted or coded information in the transmission memory 148. More specifically, the CPU 120 operates for (a) decoding the received information stored in the selected memory 184, into decoded image information, (b) temporarily storing the image information in the recording memory 154, (c) copying and transferring the image information from the recording memory 154 into the reading memory 156, (d) coding the image information by the determined coding method, and (e) storing the coded image information in the transmission memory 148.

At Step S904, the CPU 120 selects one of the transmittal-letter memories 188 which corresponds to the identified code number. Step S904 is followed by Step S905 to code the image information representing a letter of transmittal stored in the selected memory 188 and transmits the coded information to the calling facsimile machine. The coding of the image information is carried out by the same coding method as that determined at Step S903. At the following Step S906, the CPU 120 operates for transmitting one page of information stored in the selected retrieval memory 184. Step S906 is followed by Step S907 to judge whether another page of information remains in the selected retrieval memory 184. If a negative judgement is made at Step S907, the current control cycle of this routine is finished. Since the received information stored in each retrieval memory 184 includes the information representing the identified code number which information has been added at Step 803 of the facsimile reception routine of FIG. 21, the code-number information is added to each page of information transmitted from the T/F apparatus 10.

Figure 23:
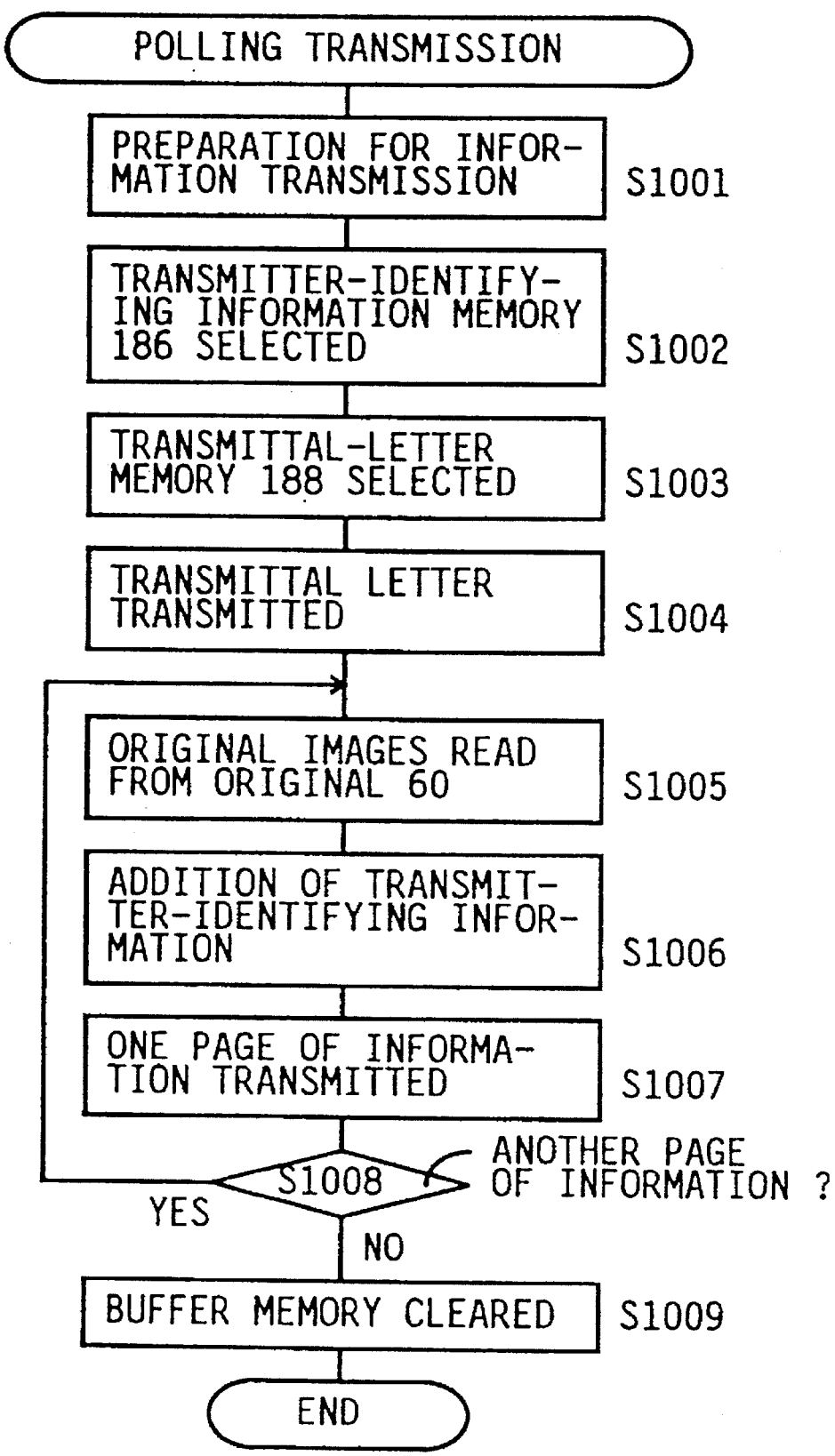
FIG. 23 is a flow chart representing a polling transmission routine according to which polling transmission is carried out by the T/F apparatus of FIG. 1.

The polling transmission routine of Step S706 of FIG. 20 will be described by reference to the flow chart of FIG. 23.

At Step S1001, the CPU 120 prepares for transmitting image information according to a known facsimile information transmission procedure. At the following Step S1002, the CPU 120 selects one of the transmitter-identifying information memories 186 which corresponds to the identified code number stored in the identified code-number memory 140, and stores the address of the selected memory 186 in the buffer memory thereof. Step S1002 is followed by Step S1003 to select one of the transmittal-letter memories 188 which corresponds to the identified code number.

At the following Step S1004, the CPU 120 operates for coding the image information representing a letter of transmittal stored in the selected memory 188, and transmits the coded information to the calling facsimile machine. Step S1004 is followed by Step S1005 to read the original images from the original 60 set on the original support 64, and store the read transmission information in the reading memory 156. At the following Step S1006, the CPU 120 operates for reading the transmitter-identifying information stored in the selected memory 186, based on the address of the selected memory 186 stored in the buffer memory, and adding the read information to the information stored in the reading memory 156. Step S1006 is followed by Step S1007 to code, using an appropriate one of the coding devices 272, 274, 276, the information stored in the reading memory 156 and store the coded information in the transmission memory 148. Then, one page of the information is transmitted to the calling facsimile machine. At the following Step S1008, the CPU 120 judges whether any original sheet 60 remains on the original support 64, based on the detection signal supplied from the original sensor 68. If a positive judgment is made at Step S1008, the control of the CPU 120 goes back to Step S1005 and the following steps. On the other hand, if a negative judgment is made, the control goes to Step S1009 to clear the buffer memory. Thus, the control cycle of this routine is ended.

Next, the paging routine of Step S9 of the main control routine of FIG. 12 will be described by reference to the flow chart of FIG. 24.

At Step S1101, the CPU 120 selects one of the paging call-number memories 176 which corresponds to the identified code number stored in the identified code-number memory 140, and stores the address of the selected memory 176 in the buffer memory. Step S1101 is followed by Step S1102 to judge whether a paging call number has been stored in the selected memory 176. If a positive judgment is made at Step S1102, the control of the CPU 120 goes to Step S1103 to judge whether the paging flag 178 corresponding to the selected memory 176 has been set to the ON state thereof. If a positive judgment is made at Step S1103, the control goes to Step S1104 to read the paging call number stored in the selected memory 176, based on the address of the selected memory 176 stored in the buffer memory, and call a communication apparatus having the read paging call number. Step S1104 is followed by Step S1105 to issue a beep sound when the communication apparatus is actually called. On the other hand, if a negative judgment is made at Step S1102 or Step S1103, or if Step S1105 finishes, the control of the CPU 120 goes to Step S1106 to clear the contents of the buffer memory. Thus, the current control cycle of this routine is finished.

Figure 25:
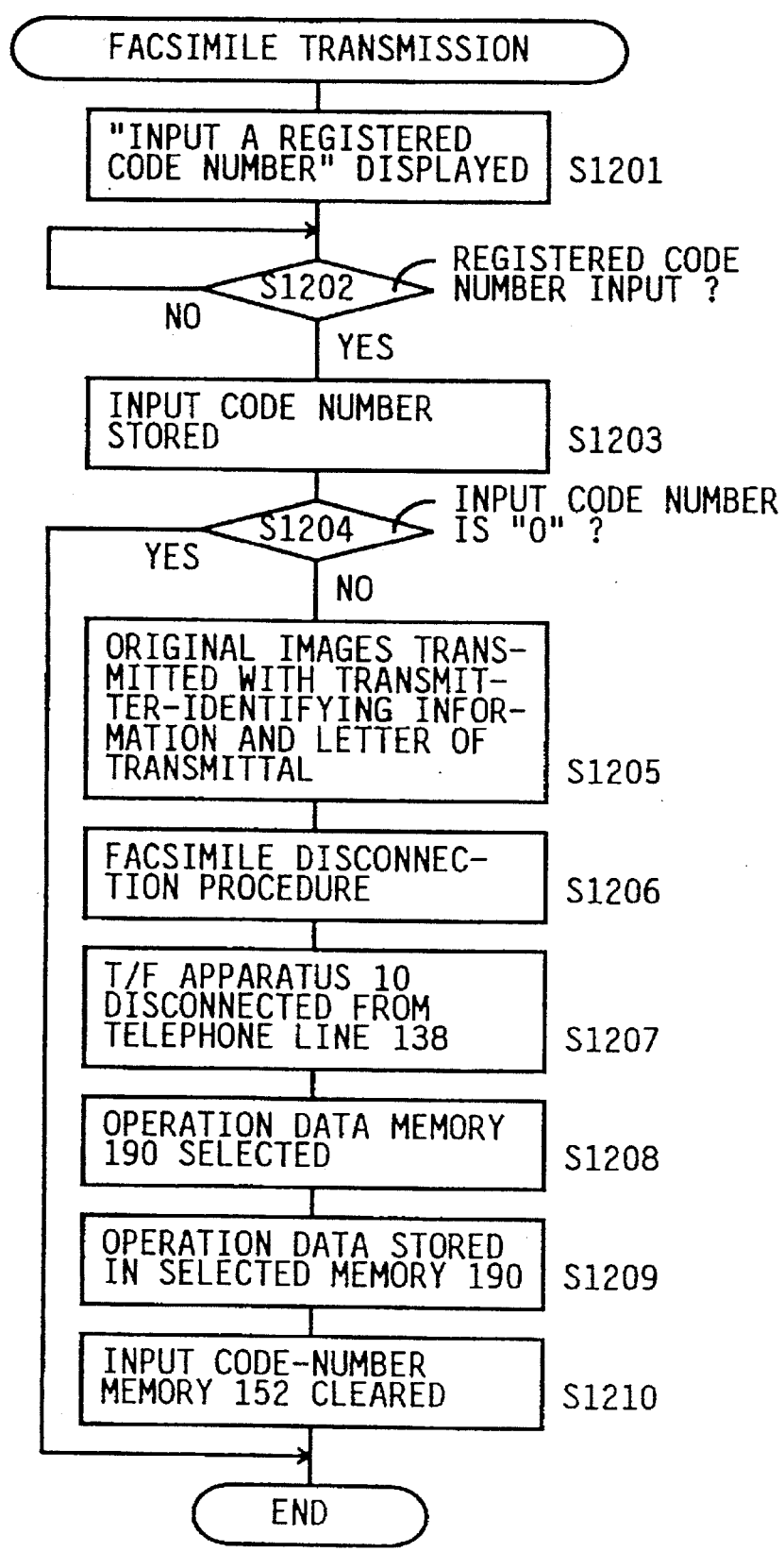
FIG. 25 is a flow chart representing a facsimile transmission routine according to which image information is transmitted by the T/F apparatus of FIG. 1.

The facsimile transmission routine of Step S13 of the main control routine of FIG. 12 will be described by reference to FIG. 25.

At Step S1201, the CPU 120 operates for displaying, on the LCD 100, a message "INPUT A REGISTERED CODE NUMBER". At the following Step S1202, the CPU 120 judges whether an appropriate one or ones of the numeral keys 104 has or have been pushed to input a code number which has been registered on the T/F apparatus 10. If the user inputs a registered code number and pushes the SET key 108 to finally fix the input code number, i.e., if a positive judgment is made at Step S1202, the control of the CPU 120 goes to Step S1203 to store the input code number in the input code-number memory 152. Step S1203 is followed by Step S1204 to judge whether the input code number is zero. The numeral "0" is used to cancel the input code number. If a positive judgment is made at Step S1204, the current control cycle of this routine is ended. On the other hand, if a negative judgment is made at Step S1204, the control goes to Step S1205 to transmit image information representing the original images of the original 60 currently set on the original support 64, together with the letter of transmittal and the transmitter-identifying information each of which corresponds to the input code number stored in the input code-number memory 152, in the same manner as described above for the polling transmission routine of FIG. 23. When no original sheet 60 is left on the original support 64, the control of the CPU 120 goes to Step S1206 to proceed a facsimile disconnection procedure to disconnect the facsimile machine of the T/F apparatus 10 from the called facsimile machine. Then, at Step S1207, the CPU 120 operates for disconnecting the apparatus 10 from the telephone line 138.

Step S1207 is followed by Step S1208 to select one of the operation data memories 190 which corresponds to the input code number stored in the input code-number memory 152. At the following Step S1209, the CPU 120 stores the operation data relating to this information transmission, in the selected memory 190. Step S1209 is followed by Step S1210 to clear the input code-number memory 152. Thus, the current control cycle is ended.

Figure 26:
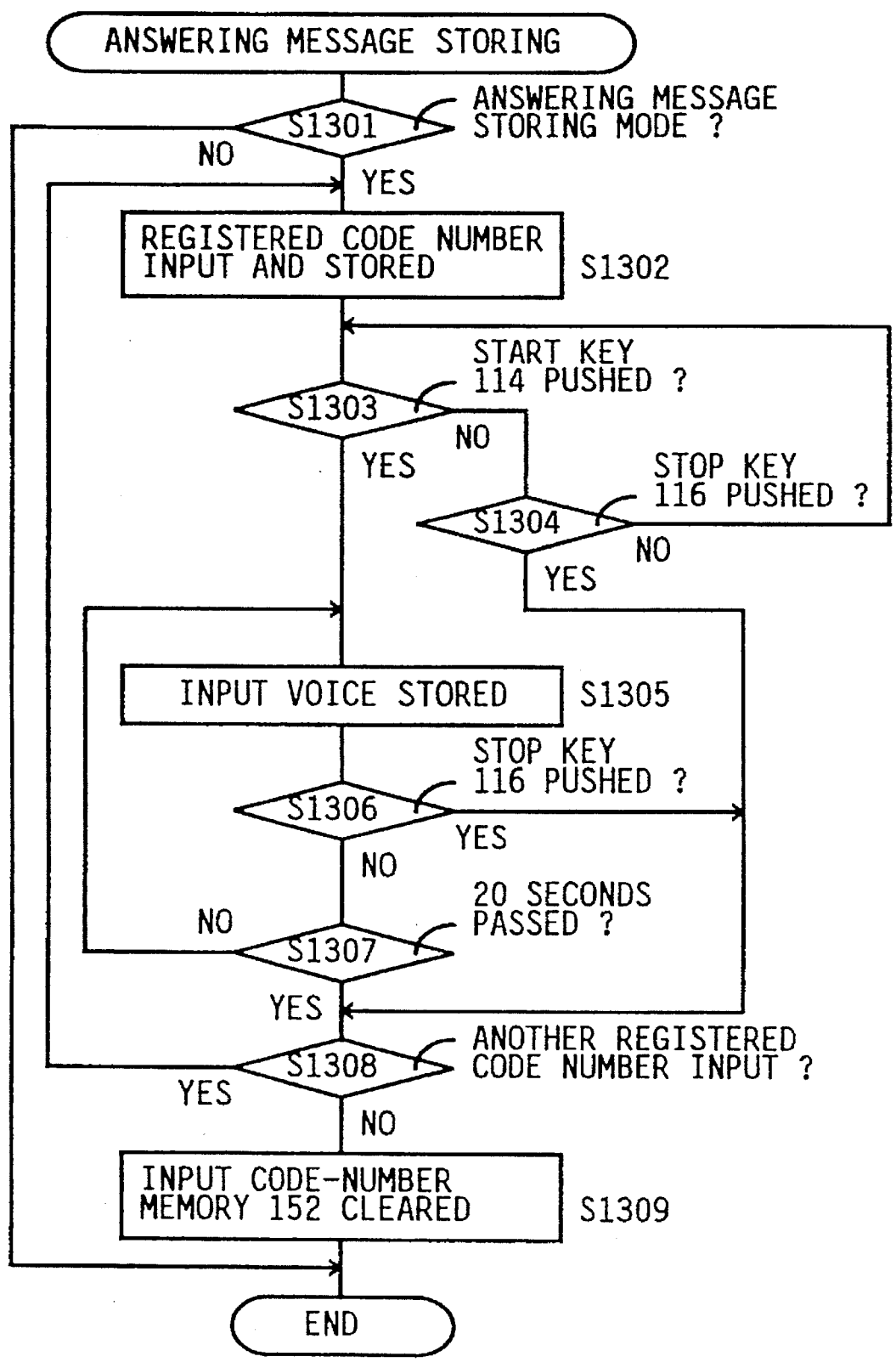
FIG. 26 is a flow chart representing an answering message storing routine according to which one or more answering messages is/are stored in the T/F apparatus of FIG. 1.

Next, the answering message storing routine of Step S14 of the main control routine of FIG. 12 will be described by reference to the flow chart of FIG. 26.

At Step S1301, the CPU 120 judges whether the answering message storing mode has been selected on the T/F apparatus 10, based on the mode data stored in the selected mode memory 142. If a positive judgment is made at Step S1301, the control of the CPU 120 goes to Step S1302 to wait for the user to input a registered code number into the apparatus 10. When the user inputs a registered code number and pushes the SET key 108, the CPU 120 stores the input code number in the input code-number memory 152. Step S1302 is followed by Step S1303 to judge whether the START key 114 has been pushed to start recording or storing an answering voice message. If a positive judgment is made at Step S1303, the control goes to Step S1305 and, on the other hand, if a negative judgment is made, the control goes to Step S1304 to judge whether the STOP key 116 has been pushed. If a positive judgment is made at Step S1304, the control goes to Step S1308 and, on the other hand, if a negative judgment is made the control goes back to Step S1303.

At Step S1305, the CPU 120 causes a timer (not shown) to start measuring a time which lapses after the START key 114 is pushed at Step S1303. Additionally, the CPU 120 selects one of the answering message memories 172 which corresponds to the input code number stored in the input code-number memory 152, and stores an answering voice message which has been input by the user according to instructions displayed on the LCD 100. The T/F apparatus 10 has a microphone (not shown) for detecting an answering voice message produced by the user. In the case where an old answering message has already been stored in the selected memory 172, the newly stored message replaces the old message stored in the memory 172, i.e., the old message is automatically erased.

At Step S1306, the CPU 120 judges whether the STOP key 116 has been pushed. If a positive judgment is made at Step S1306, the control goes to Step S1308 and, on the other hand, if a negative judgment is made, the control goes to Step S1307 to judge whether twenty seconds have lapsed after the START key 114 has been pushed at Step S1303, based on the time measured by the timer. If a positive judgment is made at Step S1307, the storing of the answering message is ended, and the control of the CPU 120 goes to Step S1308. On the other hand, if a negative judgment is made at Step S1306, the control goes back to Step S1305 and the following steps.

At Step S1308, the CPU 120 judges whether another registered code number has been input to store a corresponding answering message. If a positive judgment is made at Step S1308, the control goes back to Step S1302 to store the new code number, in place of the old code number, in the input code-number memory 152. Step S1302 is followed by Step S1303 and the other steps. If a negative judgment is made at Step S1308, the control of the CPU 120 goes to Step S1309 to clear the input code-number memory 152. Thus, the current control cycle of this routine is ended.

Figure 27:
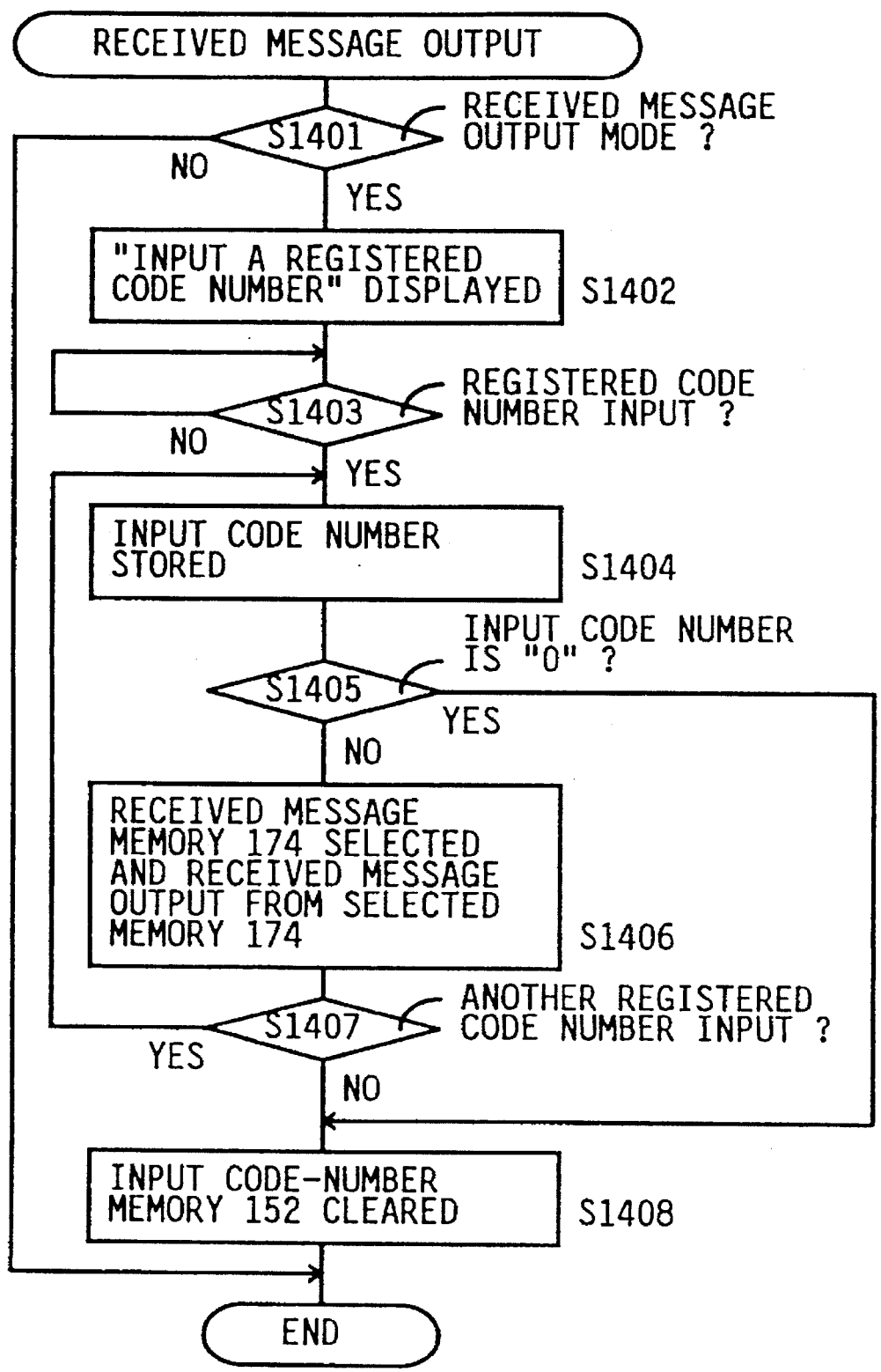
FIG. 27 is a flow chart representing a received-message output routine according to which one or more received-message is/are output from the T/F apparatus of FIG. 1.

Next, the received message output routine of Step S15 of the main control routine of FIG. 12 will be described by reference to the flow chart of FIG. 27.

At Step S1401, the CPU 120 judges whether the received message output mode has been selected on the T/F apparatus 10, based on the mode data stored in the selected mode memory 142. If a positive judgment is made at Step S1401, the control of the CPU 120 goes to Step S1402 to display a message "INPUT A REGISTERED CODE NUMBER" on the LCD 100. Step S1402 is followed by Step S1403 to judge whether the user has input a registered code number into the apparatus 10. If the user inputs a registered code number using the numeral keys 104 and then pushes the SET key 108, i.e., if a positive judgment is made at Step S1403, the control of the CPU 120 goes to Step S1404 to store the input code number in the input code-number memory 152. Step S1404 is followed by Step S1405 to judge whether the input code number is zero. If a positive judgment is made at Step S1405, the control goes to Step S1408 and, on the other hand, if a negative judgment is made, the control goes to Step S1406 to select one of the received message memories 174 which corresponds to the code number stored in the input code-number memory 152, and read the received message from the selected memory 174. The thus read voice message is output or reproduced by the speaker 136 of the T/F apparatus 10, so that the user can hear the output voice message. Step S1406 is followed by Step S1407 to judge whether another code number has been input. If a positive judgment is made at Step S1407, the control goes back to Step S1404 to store the new code number, in place of the old code number, in the input code-number memory 152. Step S1404 is followed by Step S1405 and the other steps. If a negative judgment is made at Step S1407, the control of the CPU 120 goes to Step S1408 to clear the input code-number memory 152. Thus, the current control cycle of this routine is finished.

Figure 28:
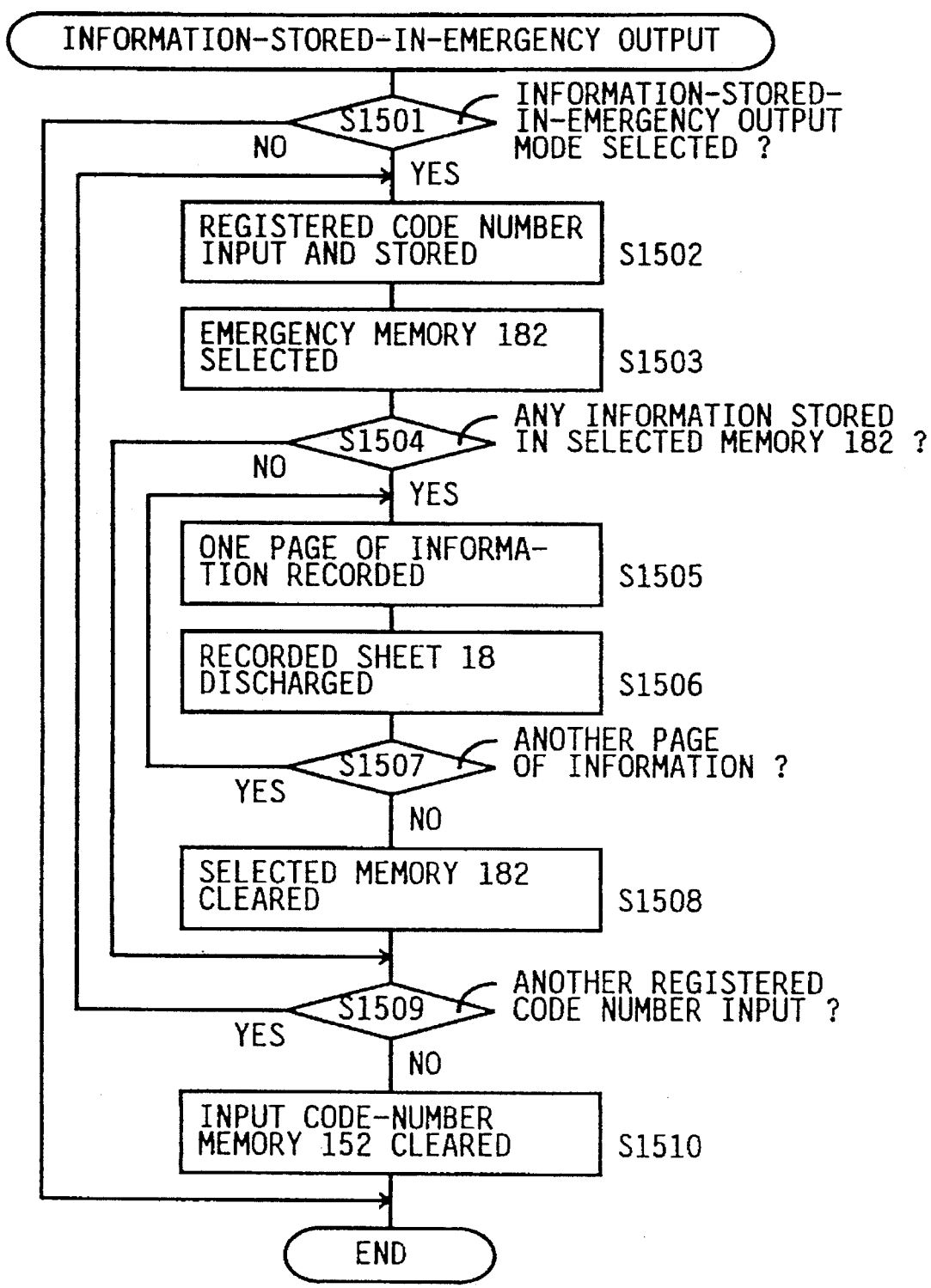
FIG. 28 is a flow chart representing an information-stored-in-emergency output routine according to which one or more batches of information stored in emergency is/are output from the T/F apparatus of FIG. 1.

The information-stored-in-emergency output routine of Step S16 of the main control routine of FIG. 12 will be described by reference to the flow chart of FIG. 28.

At Step S1501, the CPU 120 judges whether the information-stored-in-emergency output mode has been selected on the T/F apparatus 10, based on the mode data stored in the selected mode memory 142. If a positive judgment is made at Step S1501, the control of the CPU 120 goes to wait for the user to input a registered code number through operation of the keyboard 102 into the apparatus 10. If the user inputs a registered code number using the numeral keys 104 and then pushes the SET key 108, the CPU 120 operates for storing the input code number in the input code-number memory 152. Step S1502 is followed by Step S1503 to select one of the emergency memories 182 which corresponds to the input code number stored in the input code-number memory 152. At the following Step S1504, the CPU 120 judges whether any information has been stored in the selected memory 182. If a positive judgment is made at Step S1504, the control of the CPU 120 goes to Step S1505 and, on the other hand, if a negative judgment is made, the control goes to Step S1509. At Step S1505, the CPU 120 operates for recording one page of information stored in the selected memory 182, on a recording sheet 18 supplied from the sheet cassette 20. Step S1505 is followed by Step S1506 to discharge the information-recorded sheet 18 into the sheet tray 54 out of the T/F apparatus 10. At the following Step S1507, the CPU 120 judges whether another page of information remains in the selected memory 182. If a positive judgment is made at Step S1507, the control of the CPU 120 goes back to Step S1505 and the following steps and, on the other hand, if a negative judgment is made at Step S1507, the control goes to Step S1508 to clear or initialize the selected memory 182. While the image information stored in the selected memory 182 is recorded on the recording sheet or sheets 18, the occurrence of any recording abnormality is monitored by the computer 128 according to a pre-stored algorithm (not shown). If an abnormality occurs, the selected memory 182 is not initialized. In this case, the CPU 120 does not erase the information stored in the selected memory 182, and proceeds with Step S1509. At Step S1509, the CPU 120 judges whether another registered code number has been input. If a positive judgment is made at Step S1509, the control goes back to Step S1502 to store the new code number, in place of the old code number, in the input code-number memory 152. Step S1502 is followed by Step S1503 and the following steps. If a negative judgment is made at Step S1509, the control of the CPU 120 goes to Step S1510 to clear the input code-number memory 152. Thus, the current control cycle of this routine is ended.

Figure 29:
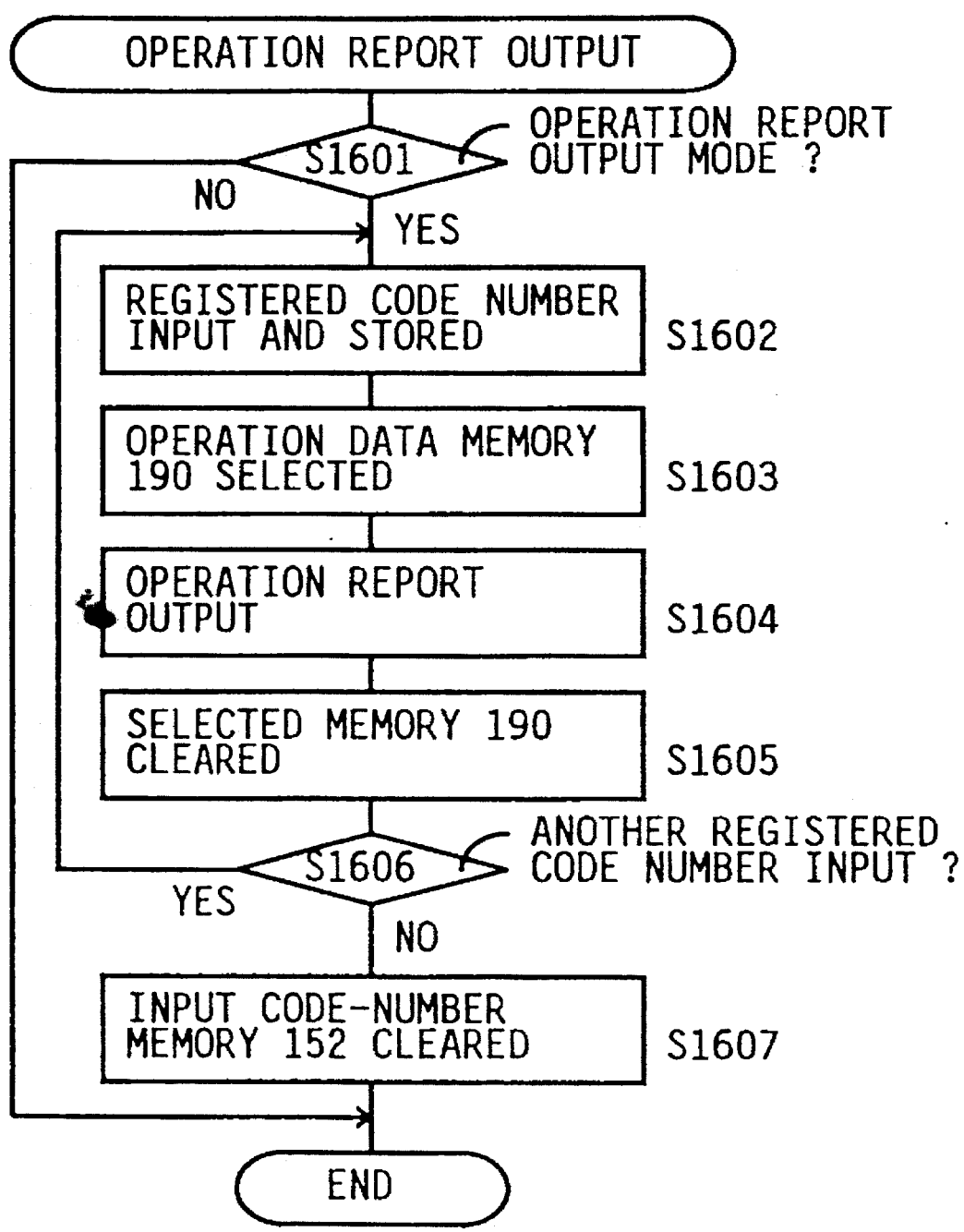
FIG. 29 is a flow chart representing an operation report output routine according to which an operation report is output from the T/F apparatus of FIG. 1.

Next, the operation report output routine of Step S17 of the main control routine of FIG. 12 will be described by reference to the flow chart of FIG. 29.

At Step S1601, the CPU 120 judges whether the operation report output mode has been selected on the T/F apparatus 10, based on the mode data stored in the selected mode memory 142. If a positive judgment is made at Step S1601, the control of the CPU 120 goes to Step S1602 to wait for the user to input a registered code number through operation of the keyboard 102 into the apparatus 10 according to instructions displayed on the LCD 100. If the user inputs a registered code number using the numeral keys 104 and then pushes the SET key 108, the CPU 120 operates for storing the input code number in the input code-number memory 152. Step S1602 is followed by Step S1603 to select one of the operation data memories 190 which corresponds to the input code number stored in the input code-number memory 152. At the following Step S1604, the CPU 120 operates for recording the operation data stored in the selected memory 190, on a recording sheet 18 supplied from the sheet cassette 20, and discharging the data-recorded sheet 18 out of the T/F apparatus 10. Step S1604 is followed by Step S1605 to clear the selected memory 190. Step S1605 is followed by Step S1606 to judge whether another registered code number has been input. If a positive judgment is made at Step S1606, the control goes back to Step S1602 to store the new code number, in place of the old code number, in the input code-number memory 152. Step S1602 is followed by Step S1603 and the following steps. If a negative judgment is made at Step S1606, the control of the CPU 120 goes to Step S1607 to clear the input code-number memory 152. Thus, the current control cycle of this routine is finished.

In addition, the paging call-number storing routine of Step S18 of the main control routine of FIG. 12 will be described by reference to the flow chart of FIG. 30.

At Step S1701, the CPU 120 judges whether the paging call-number storing mode has been selected on the T/F apparatus 10, based on the mode data stored in the selected mode memory 142. If a positive judgment is made at Step S1701, the control of the CPU 120 goes to Step S1702 to wait for the user to input a registered code number into the apparatus 10 according to instructions displayed on the LCD 100. If the user inputs a registered code number using the numeral keys 104 and then pushes the SET key 108, the CPU 120 operates for storing the input code number in the input code-number memory 152. Step S1702 is followed by Step S1703 to select one of the paging call-number memories 176 which corresponds to the input code number stored in the input code-number memory 152.

At the following Step S1704, the CPU 120 waits for the user to input a code number of a communication apparatus to be paged, into the selected memory 176, according to instructions displayed on the LCD 100. For example, the numeral keys 104 are used to input a paging code number. Step S1704 is followed by Step S1705 to judge whether another registered code number has been input. If a positive judgment is made at Step S1705, the control goes back to Step S1702 to store the new code number, in place of the old code number, in the input code-number memory 152. Step S1702 is followed by Step S1703 and the following steps. If a negative judgment is made at Step S1705, the control of the CPU 120 goes to Step S1706 to clear the input code-number memory 152. Thus, the current control cycle of this routine is ended.

Figure 31:
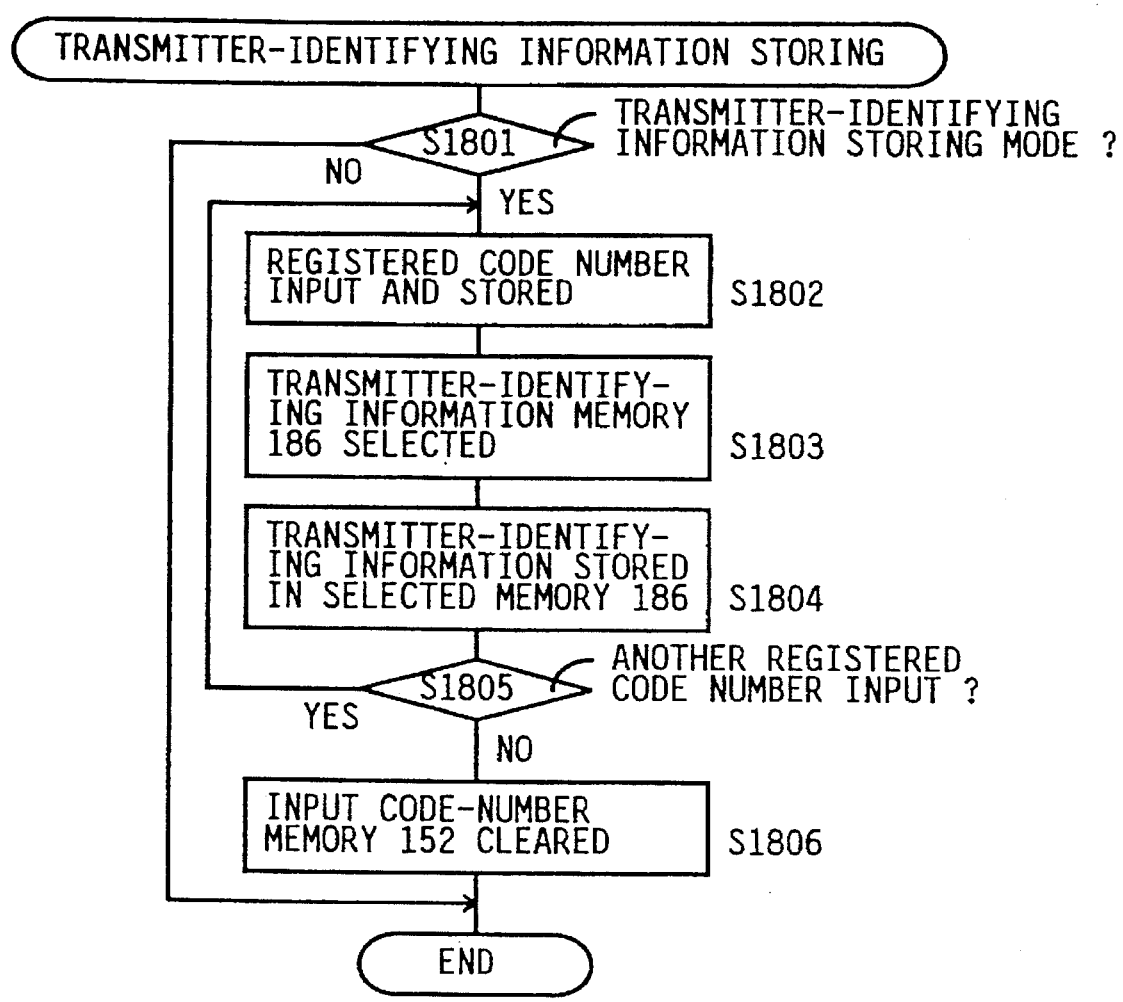
FIG. 31 is a flow chart representing a transmitter-identifying information storing routine according to which one or more batches of transmitter-identifying information is/are stored in the T/F apparatus of FIG. 1.

Next, the transmitter-identifying information storing routine of Step S19 of the main control routine of FIG. 12 will be described by reference to the flow chart of FIG. 31.

At Step S1801, the CPU 120 judges whether the transmitter-identifying information storing mode has been selected on the T/F apparatus 10, based on the mode data stored in the selected-mode memory 142. If a positive judgment is made at Step S1801, the control of the CPU 120 goes to Step S1802 to wait for the user to input a registered code number into the apparatus 10. If the user inputs a registered code number using the numeral keys 104 and then pushes the SET key 108, the CPU 120 operates for storing the input code number in the input code-number memory 152. Step S1802 is followed by Step S1803 to select one of the transmitter-identifying information memories 186 which corresponds to the input code number stored in the input code-number memory 152.

At the following Step S1804, the CPU 120 waits for the user to input a batch of transmitter-identifying information, into the selected memory 186, according to instructions displayed on the LCD 100. For example, the numeral keys 104 are used to input, as a transmitter-identifying information, the same number as the input code number, or the same number as the own call number corresponding to the input code number. Step S1804 is followed by Step S1805 to judge whether another registered code number has been input. If a positive judgment is made at Step S1805, the control goes back to Step S1802 to store the new code number, in place of the old code number, in the input code-number memory 152. Step S1802 is followed by Step S1803 and the following steps. If a negative judgment is made at Step S1805, the control of the CPU 120 goes to Step S1806 to clear the input code-number memory 152. Thus, the current control cycle of this routine is ended.

Figure 32:
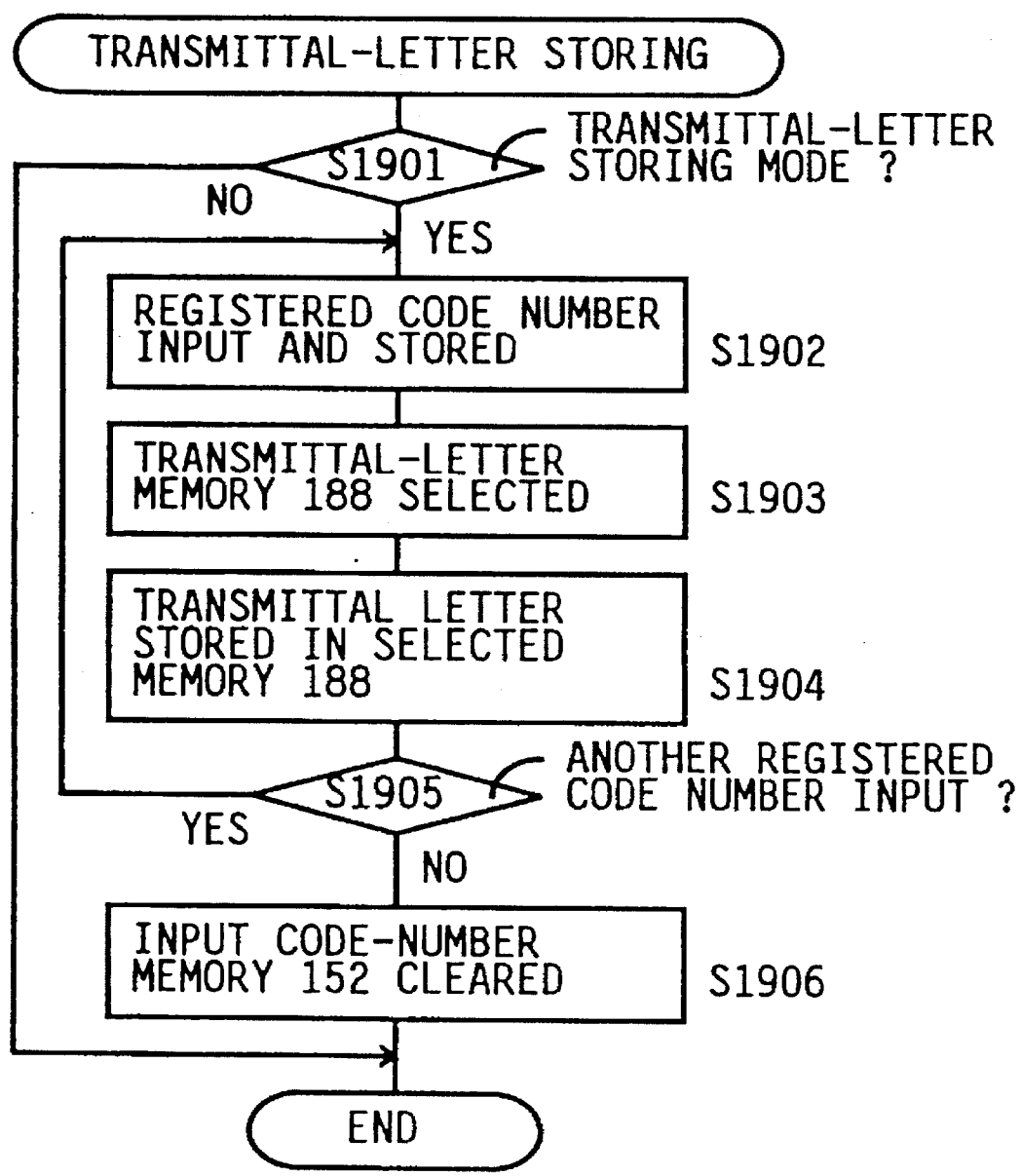
FIG. 32 is a flow chart representing a transmittal-letter storing routine according to which one or more transmittal letters is/are stored in the T/F apparatus of FIG. 1.

Furthermore, the transmittal-letter storing routine of Step S20 of the main control routine of FIG. 12 will be described by reference to the flow chart of FIG. 32.

At Step S1901, the CPU 120 judges whether the transmittal-letter storing mode has been selected on the T/F apparatus 10, based on the mode data stored in the selected mode memory 142. If a positive judgment is made at Step S1901, the control of the CPU 120 goes to Step S1902 to wait for the user to input a registered code number into the apparatus 10. If the user inputs a registered code number using the numeral keys 104 and then pushes the SET key 108, the CPU 120 operates for storing the input code number in the input code-number memory 152. Step S1902 is followed by Step S1903 to select one of the transmittal-letter memories 188 which corresponds to the input code number stored in the input code-number memory 152.

At the following Step S1904, the CPU 120 waits for the user to input a letter of transmittal into the selected memory

186, according to instructions displayed on the LCD 100. The reading device 62 is controlled to read original images from an original letter of transmittal. Step S1904 is followed by Step S1905 to judge whether another registered code number has been input. If a positive judgment is made at Step S1905, the control goes back to Step S1902 to store the new code number, in place of the old code number, in the input code-number memory 152. Step S1902 is followed by Step S1903 and the other steps. If a negative judgment is made at Step S1905, the control of the CPU 120 goes to Step S1906 to clear the input code-number memory 152. Thus, the current control cycle of this routine is ended.

While the present invention has been described in its preferred embodiment relating to the answering telephone and facsimile (T/F) apparatus 10, the principle of the present invention is applicable to a telephone set without any facsimile function. The present invention is also applicable to various sorts of telephone operations other than those described above on the T/F apparatus 10, for example, a memo-message transmission wherein the user stores his or her memo messages, i.e., personal voice messages, in memo-message memories related with the own call numbers of the telephone function of the apparatus 10, respectively, and wherein the apparatus 10 transmits to a calling or called telephone set the personal voice message stored in one of the memories which corresponds to one of the own call numbers used by the calling telephone set or used to call the called telephone set.

The operator panel 98 of the T/F apparatus 10 may additionally include a hook button or key which produces, upon pushing thereof, signals identical with the signals produced when the handset 16 is picked up from, and put down on, the lower housing 12, respectively.

Although in the illustrated embodiment the answering telephone mode, for example, is established with respect to all the own call numbers allotted to the telephone function of the T/F apparatus 10, it is possible that the answering telephone mode be established with respect to only two or more call numbers selected from all the own call numbers. This applies to the other telephone operations of the apparatus 10.

Figure 24:
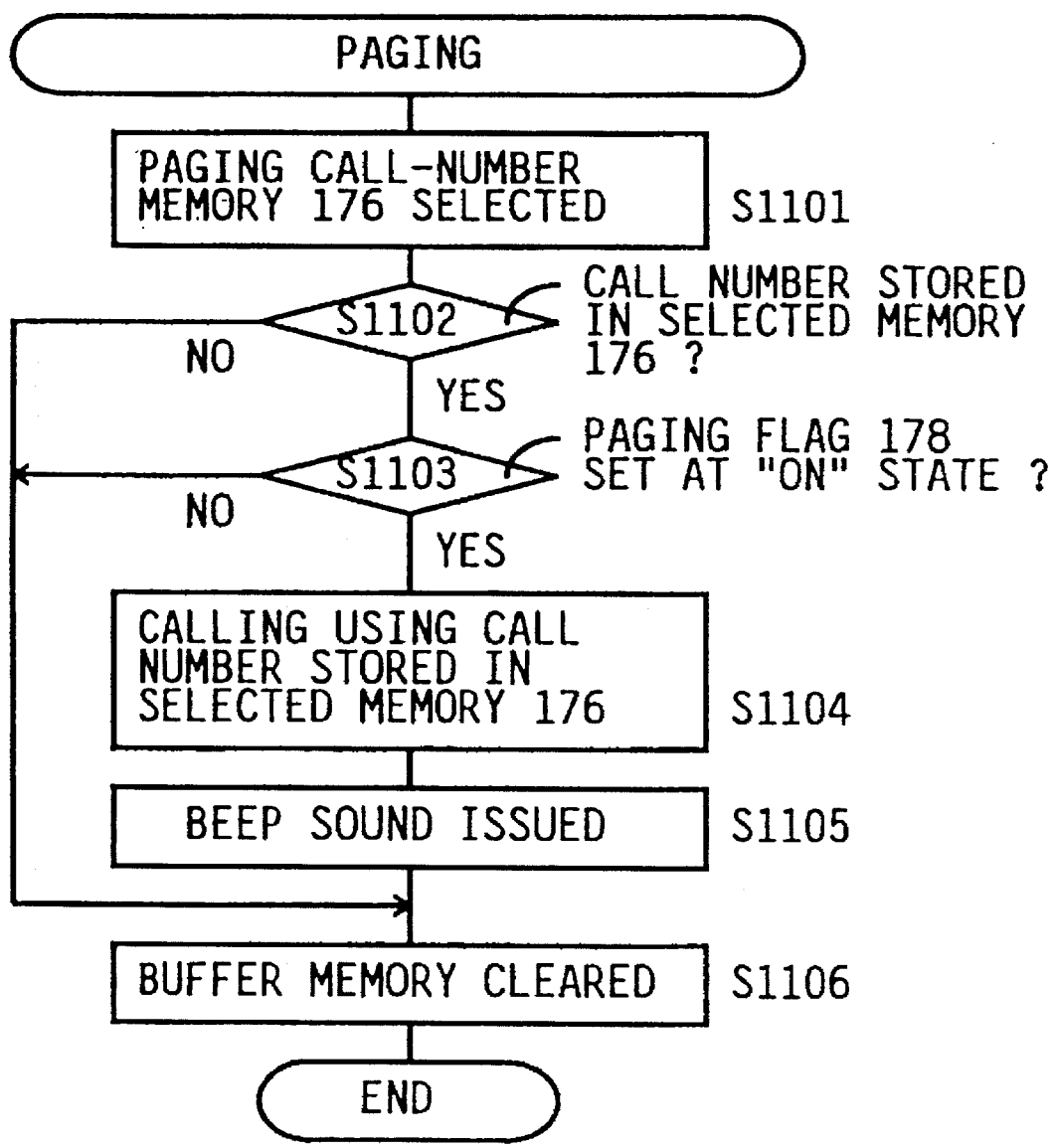
FIG. 24 is a flow chart representing a paging routine according to which paging is carried out by the T/F apparatus of FIG. 1.

While in the illustrated embodiment the T/F apparatus 10 informs, at Step S1104 of FIG. 24, a paged or called communication apparatus of only the fact that the apparatus 10 has received a voice message and stored it in a received message memory 174, Step S1104 may be modified such that the apparatus 10 transmits, to the paged apparatus, the voice message stored in the memory 174.

The time of paging is not limited to immediately after the time of receiving and storing of a message, and paging may be carried out a pre-determined time thereafter. Otherwise, paging may be carried out in response to calling of a calling communication apparatus. A stored message may be transmitted to a paged apparatus in response to a command supplied from the paged apparatus. In the case where a stored message is transmitted to a paged telephone set, the T/F apparatus 10 may be modified such that when a user of the paged telephone set is talking with another person or when a user of the paged telephone set does not pick up the handset, the apparatus 10 repeats paging at pre-determined intervals of time.

Figure 30:
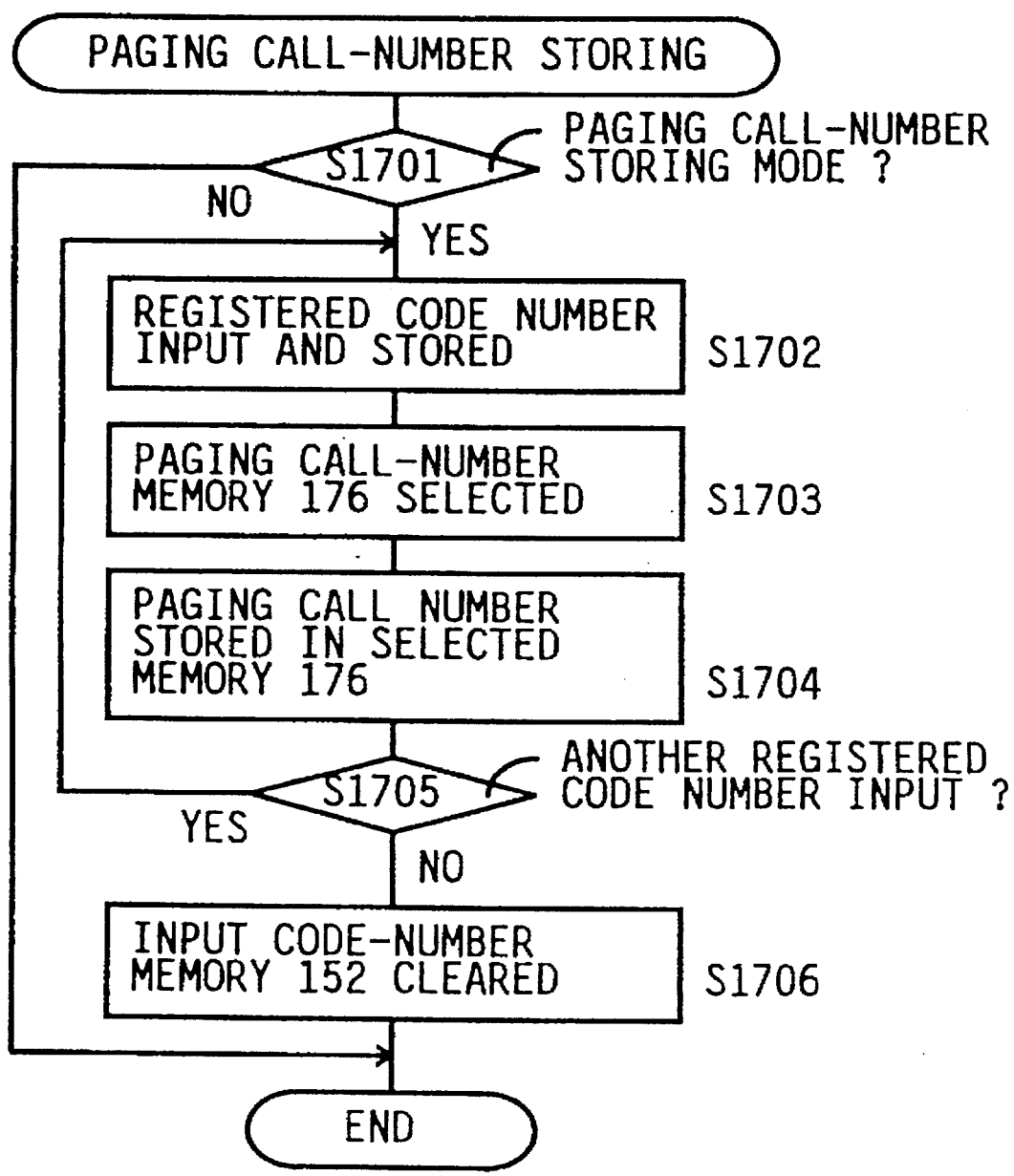
FIG. 30 is a flow chart representing a paging call number storing routine according to which one or more paging call numbers is/are stored in the T/F apparatus of FIG. 1.

While in the illustrated embodiment the paging call numbers are directly stored by operating the numeral keys 104 and other keys on the operator panel 98, at Step S1704 of FIG. 30, the T/F apparatus 10 may be modified such that paging call numbers are stored in response to commands supplied from other telephone sets. Whether that a paged telephone set is informed of only the fact of having received and stored a message, or that the stored message is additionally transmitted to the paged telephone set, may be specified directly by operating the operator panel 98, or indirectly in response to a command supplied from an external telephone set.

It is to be understood that the present invention may be embodied with other changes, improvements, and modifications that may occur to those skilled in the art without departing from the scope and spirit of the invention defined in the appended claims.

What is claimed is:

1. A telephone set for use with an exchanger which is connected thereto via a single communication line and is connected to other telephone sets via other communication lines and which supplies each one of a plurality of different own call signals to the telephone set to connect each one of the other telephone sets to the telephone set, the different own call signals identifying a plurality of different own call numbers, respectively, which are allotted to the telephone set according to a common numbering rule, the telephone set comprising:

a data obtaining device which obtains a plurality of sets of own-call-number data each set of which identifies a corresponding one of said plurality of different own call numbers allotted to the telephone set according to said common numbering rule, each of said plurality of different own call numbers identifying the telephone set from said other telephone sets to which other call numbers different from the plurality of different own call numbers are allotted according to said common numbering rule;

said data obtaining device comprising a signal detector which detects, as each one of said plurality of sets of own-call-number data, said each one of a plurality of own call signals supplied from the exchanger to the telephone set to connect said each one of the other telephone sets to the telephone set;

a plurality of memories which are related with said plurality of different own call numbers, respectively, and in which a plurality of batches of sound information are stored, respectively; and a transmitter which transmits, to said each one of said other telephone sets, the batch of sound information stored in one of said memories which corresponds to one of said plurality of different own call numbers identified by said each one of a plurality of own call signals detected by said signal detector.

2. A telephone set according to claim 1, further comprising a storing device which is operable by a user for storing said batches of sound information in said memories, respectively.

3. A telephone set according to claim 1, further comprising a receiver which receives a batch of sound information from a first one of said other telephone sets and stores the received batch of information in a first one of said memories which corresponds to a first one of said plurality of different own call numbers identified by a first one of said sets of own-call-number data obtained by said data obtaining device.

4. A telephone set according to claim 3, wherein said transmitter comprises means for transmitting, to a second one of said other telephone sets, the batch of sound information stored by said receiver in a second one of said memories which corresponds to a second one of said plurality of different own call numbers identified by a second one of said sets of own-call-number data obtaining device.

5. A telephone set according to claim 1, further comprising:
- a plurality of remote-control code memories which are related with said plurality of different own call numbers, respectively, and in which a plurality of remote-control codes are stored, respectively; and
- judging means for judging whether a signal supplied from said each one of said other telephone sets corresponds to the remote-control code stored in one of said remote-control code memories which corresponds to said one of said different own call numbers identified by said each one own call signal;
- said transmitter transmitting said batch of sound information stored in said one of said memories, when said judging means provides a positive judgment.

6. A telephone set according to claim 1, wherein said data obtaining device comprises an input device which is operated by said user for inputting one of said sets of own-call-number data.

7. A telephone set for use with an exchanger which is connected thereto via a single communication line and is connected to other telephone sets via other communication lines and which supplies each one of a plurality of different own call signals to the telephone set to connect each one of the other telephone sets to the telephone set, the different own call signals identifying a plurality of different own call numbers, respectively, which are allotted to the telephone set according to a common numbering rule, the telephone set comprising:
- a data obtaining device which obtains a plurality of sets of own-call-number data each set of which identifies a corresponding one of said plurality of different own call numbers allotted to the telephone set according to said common numbering rule, each of said plurality of different own call numbers identifying the telephone set from said other telephone sets to which other call numbers different from the plurality of different own call numbers are allotted according to said common numbering rule;
- said data obtaining device comprising a signal detector which detects, as each one of said plurality of sets of own-call-number data, said each one of a plurality of own call signals supplied from the exchanger to the telephone set to connect said each one of the other telephone sets to the telephone set;
- a plurality of received-information memories related with said plurality of different own call numbers, respectively; and
- a receiver which receives a batch of sound information from said each one of said other telephone sets and stores the received batch of sound information in one of said received-information memories which corresponds to one of said plurality of different own call numbers identified by said each one of a plurality of own call signals detected by said signal detector.

8. A telephone set according to claim 7, further comprising:
- a plurality of call-number memories which are related with said plurality of different own call numbers, respectively, and in which a plurality of call numbers are stored, respectively; and
- a calling device which calls one of said other telephone sets which has the call number stored in one of said call-number memories which corresponds to one of said plurality of different own call number identified by one of said sets of call-number data obtained by said data obtaining device.

9. A telephone set according to claim 8, further comprising a storing device which is operable by a user for storing said call numbers in said call-number memories, respectively.

10. A telephone set according to claim 8, further comprising a transmitter which transmits, to the called one of said other telephone sets, the batch of sound information stored in said one of said received-information memories.

11. A telephone set according to claim 7, further comprising an output device which outputs the batch of sound information stored in said one of said received-information memories which corresponds to one of said plurality of different own call numbers identified by one of said sets of own-call-number data obtained by said data obtaining device.

12. A telephone set according to claim 11, wherein said output device comprises a speaker which reproduces said batch of sound information.

13. A communication apparatus for use with an exchanger which is connected thereto via a single communication line and is connected to other communication apparatuses via other communication lines and which supplies each one of a plurality of different own call signals to the communication apparatus to connect each one of the other communication apparatuses to the communication apparatus, the different own call signals identifying a plurality of different own call numbers, respectively, which are allotted to the communication apparatus according to a common numbering rule, the communication apparatus comprising:
- a data obtaining device which obtains a plurality of sets of own-call-number data each set of which identifies a corresponding one of said plurality of different own call numbers allotted to the communication apparatus according to said common numbering rule, each of said plurality of different own call numbers identifying the communication apparatus from said other communication apparatuses to which other call numbers different from the plurality of different own call numbers are allotted according to said common numbering rule;
- said data obtaining device comprising a signal detector which detects, as each one of said plurality of sets of own-call-number data, said each one of a plurality of own call signals supplied from the exchanger to the communication apparatus to connect said each one of the other communication apparatuses to the communication apparatus;
- a plurality of memories which are related with said plurality of different own call numbers, respectively, and in which a plurality of batches of information are stored, respectively; and
- a transmitter which transmits, to said each one of said other communication apparatuses, the batch of information stored in one of said memories which corresponds to one of said plurality of different own call numbers identified by said each one of a plurality of own call signals detected by said signal detector.

14. A communication apparatus according to claim 13, further comprising a calling device which calls said each one of said other communication apparatuses, said transmitter transmitting said batch of sound information to the called communication apparatus.

15. A communication apparatus for use with an exchanger which is connected thereto via a single communication line and is connected to other communication apparatuses via other communication lines and which supplies each one of a plurality of different own call signals to the communication apparatus to connect each one of the other communication apparatuses to the communication apparatus, the different own call signals identifying a plurality of different own call numbers, respectively, which are allotted to the communication apparatus according to a common numbering rule, the communication apparatus comprising:

a data obtaining device which obtains a plurality of sets of own-call-number data each set of which identifies a corresponding one of said plurality of different own call numbers allotted to the communication apparatus according to said common numbering rule, each of said plurality of different own call numbers identifying the communication apparatus from said other communication apparatuses to which other call numbers different from the plurality of different own call numbers are allotted according to said common numbering rule;

said data obtaining device comprising a signal detector which detects, as each one of said plurality of sets of own-call-number data, said each one of a plurality of own call signals supplied from the exchanger to the communication apparatus to connect said each one of the other communication apparatuses to the communication apparatus;

a plurality of memories related with said plurality of different own call numbers, respectively, and;

a receiver which receives a batch of information from said each one of said other communication apparatuses and stores the received batch of information in one of said memories which corresponds to one of said plurality of different own call numbers identified by said each one of a plurality of own call signals detected by said signal detector.

* * * * *